United States Patent
Inokuchi

(10) Patent No.: US 12,447,766 B2
(45) Date of Patent: Oct. 21, 2025

(54) DISPLAY

(71) Applicant: TOPPAN INC., Tokyo (JP)

(72) Inventor: Masami Inokuchi, Tokyo (JP)

(73) Assignee: TOPPAN INC., Tokyo (JP)

( * ) Notice: Subject to any disclaimer, the term of this patent is extended or adjusted under 35 U.S.C. 154(b) by 393 days.

(21) Appl. No.: 18/126,885

(22) Filed: Mar. 27, 2023

(65) Prior Publication Data

US 2023/0234389 A1     Jul. 27, 2023

Related U.S. Application Data

(63) Continuation of application No. PCT/JP2021/029803, filed on Aug. 13, 2021.

(30) Foreign Application Priority Data

Sep. 29, 2020    (JP) ................................ 2020-162927

(51) Int. Cl.
    *B42D 25/324*       (2014.01)
    *B42D 25/342*       (2014.01)
    (Continued)

(52) U.S. Cl.
    CPC ......... *B42D 25/324* (2014.10); *B42D 25/342* (2014.10); *B42D 25/373* (2014.10); *G02B 5/0808* (2013.01)

(58) Field of Classification Search
    CPC .. B42D 25/324; B42D 25/342; B42D 25/373; B42D 25/351; B42D 25/21;
    (Continued)

(56) References Cited

U.S. PATENT DOCUMENTS 12,043,054 B2 *   7/2024   Higuchi ............... B42D 25/435
2008/0037131 A1    2/2008   Steenblik et al.
(Continued)

FOREIGN PATENT DOCUMENTS

EP    2 448 767 B1    9/2013
EP    3 656 579 A1    5/2020
(Continued)

OTHER PUBLICATIONS

European Extended Search Report issued in corresponding European Patent Application No. 21874932.3 dated Feb. 9, 2024 (7 pages).
(Continued)

*Primary Examiner* — Tuyen Tra
(74) *Attorney, Agent, or Firm* — Foley & Lardner LLP

(57) ABSTRACT

A display technique capable of displaying special images. A display includes an image display layer and a mask layer. The image display layer includes one or more colored portions, and displays a transmitted light image corresponding to the one or more colored portions when illuminated with white light. The mask layer includes a transparent material layer having a first major surface and a second major surface, and the first major surface includes one or more regions each composed of first and second strip-shaped parts alternately arranged in a width direction. The second strip-shaped parts are provided with a relief structure. A portion of the mask layer corresponding to at least one of the one or more regions conceals a portion of the transmitted light image corresponding to the second strip-shaped parts.

14 Claims, 18 Drawing Sheets

(51) Int. Cl.
*B42D 25/373* (2014.01)
*G02B 5/08* (2006.01)

(58) Field of Classification Search
CPC .... B42D 25/435; B42D 25/445; B42D 25/41; G02B 5/0808; G02B 27/60; B41M 3/14
See application file for complete search history.

(56) References Cited

U.S. PATENT DOCUMENTS

| | | |
|---|---|---|
| 2013/0038942 A1 | 2/2013 | Holmes |
| 2013/0050818 A1 | 2/2013 | Holmes |
| 2013/0050819 A1 | 2/2013 | Holmes |
| 2013/0056971 A1 | 3/2013 | Holmes |
| 2013/0300101 A1* | 11/2013 | Wicker .......... B42D 25/00 283/67 |
| 2018/0154677 A1 | 6/2018 | Lister et al. |
| 2018/0215187 A1 | 8/2018 | Whiteman et al. |
| 2021/0206192 A1 | 7/2021 | Godfrey |

FOREIGN PATENT DOCUMENTS

| | | |
|---|---|---|
| JP | H06-40190 A | 2/1994 |
| JP | 2002-279480 A | 9/2002 |
| JP | 2003-094866 A | 4/2003 |
| JP | 2013-521528 A | 6/2013 |
| WO | WO-2009/139396 A1 | 11/2009 |
| WO | WO-2019/063961 A1 | 4/2019 |

OTHER PUBLICATIONS

International Searching Authority, "International Search Report," issued in connection with International Patent Application No. PCT/JP2021/029803 dated Sep. 28, 2021.

International Searching Authority, "Written Opinion," issued in connection with International Patent Application No. PCT/JP2021/029803 dated Sep. 28, 2021.

* cited by examiner

DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/029803, filed on Aug. 13, 2021, which in turn claims the benefit of JP 2020-162927, filed Sep. 29, 2020, the disclosures of all which are incorporated herein by reference in its entirety.

TECHNICAL FIELD

Embodiments of the present invention relate to display technology.

BACKGROUND

In identification (ID) cards such as employee ID cards, driver's licenses and student ID cards, fixed information such as a background pattern and individual information such as a name, a unique card number and an expiration date are recorded. Such ID cards are used for identifying individuals in a facility or when entering or exiting the facility, for example. In order to prevent the ID cards from being counterfeited or altered, measures are taken such as special printing using special ink and affixing a facial image or a hologram.

However, with the recent common availability of color copying machines and the advent of highly functional photolithography machines, techniques of counterfeiting and alteration are becoming more advanced. Therefore, the risk of crimes due to counterfeiting or alteration is increasing.

There is a method of determining authenticity of an ID card by recording invisible information, which cannot be recognized in normal conditions, on the ID card in advance and using a reader or determiner to read the invisible information. Since the invisible information cannot be recognized under normal conditions, this technique can be more effective as an anti-counterfeiting measure.

Invisible information can be visualized by, for example, printing fine lines or dot pattern on an ID card in advance, and overlaying a determination film or a lenticular film on the ID card to produce moiré due to interference with the pattern. The authenticity of the ID card can be determined by the presence/absence or the shape of the moiré.

[Citation List][Patent Literature] PTL 1: JP 116-40190 A; PTL 2: JP 2002-279480 A; PTL 3: WO 2009/139396 A.

SUMMARY OF THE INVENTION

An object of embodiments of the present invention is to provide a display technique capable of displaying special images.

According to an aspect of the present invention, there is provided a display including an image display layer including one or more colored portions, the image display layer displaying a transmitted light image corresponding to the one or more colored portions when illuminated with white light; and a mask layer including a transparent material layer having a first major surface and a second major surface, the first major surface including one or more regions each composed of first and second strip-shaped parts alternately arranged in a width direction, the second strip-shaped parts being provided with a relief structure, and a portion of the mask layer, corresponding to at least one of the one or more regions, concealing a portion of the transmitted light image corresponding to the second strip-shaped parts.

The relief structure shifts a reflection angle of at least part of reflected light from a specular reflection angle when the second strip-shaped part is illuminated with light. The relief structure may be, for example, a scattering structure that produces isotropic light-scattering, an anisotropic scattering structure that exhibits light-scattering anisotropy, or a light deflection structure that emits strong reflected light at an angle different from a specular reflection angle, such as a blazed diffraction grating. The relief structure provides the second strip-shaped part with reflection properties and transmissive properties different from those of the flat first strip-shaped part.

Therefore, when the display is placed on a black surface with the image display layer positioned between the black surface and the mask layer, and observed while the mask layer of the display is illuminated with white light under the condition under which specularly reflected light is not seen (hereinafter, this observation condition is referred to as a first observation condition), the observer can recognize light emitted from the relief structure, for example, scattered light, as reflected light. That is, in this case, the display displays an image corresponding to the one or more regions.

Further, when transmitted light is observed while the mask layer or the image display layer of the display is illuminated with white light (hereinafter, this observation condition is referred to as a second observation condition), a partially concealed image is displayed in which a transmitted light image is concealed by the mask layer.

When the display is placed on a white surface with the mask layer positioned between the white surface and the image display layer, and the image display layer of the display is illuminated with white light (hereinafter, this observation condition is referred to as a third observation condition), the observer can recognize a reflected light image corresponding to the above transmitted light image. That is, in this case, the display displays an image corresponding to the one or more colored portions.

As described above, the display can display various images according to observation conditions. That is, the above display can display special images.

According to another aspect of the present invention, there is provided a display according to the above aspect in which the first major surface is separated from the image display layer.

Due to the first major surface being separated from the image display layer, the position of a portion of the transmitted light image concealed by the mask layer changes when the observation angle is changed under the second observation condition. Accordingly, an image displayed by the above display under the second observation condition, for example, can be changed according to the observation angle.

According to still another aspect of the present invention, there is provided a display according to the above aspect in which a distance from the first major surface to the image display layer is in a range of 50 µm to 2 mm. If the above distance decreases, the display becomes easy to break. If the above distance increases, the display becomes thicker. In order to achieve high printing accuracy with a general device, the distance is preferably in a range of 100 m to 2 mm, and more preferably in a range of 150 µm to 1 mm.

Further, when the above distance is long, the position of a portion of the transmitted light image concealed by the mask layer changes to a large degree when the observation angle is changed under the second observation condition. Accordingly, an image displayed by the above display under the second observation condition, for example, can be changed to a large degree according to the observation angle. However, when the above distance is excessively long, the observer perceives flickering of the image. In order to enhance the change in image according to the observer angle without making the observer perceive flickering of the image, the distance is preferably in a range of 100 μm to 800 μm.

According to still another aspect of the present invention, there is provided a display according to any one of the above aspects in which the first strip-shaped parts have a pitch $P_B1$ in a range of 50 μm to 500 μm. Considering the dimensions of the colored portions formed by printing or the like and the distance from the first major surface to the image display layer, a structure in which the pitch $P_B1$ is within the above range may be suitable, for example, for changing the image under the second observation condition as described above.

The pitch $P_B1$ is preferably in a range of 100 μm to 350 μm. This configuration is advantageous for stable printing and for preventing jagged edges in the image displayed by the display. The pitch $P_B1$ is preferably in a range of 150 μm to 300 μm. With this configuration, a particularly excellent appearance can be achieved.

According to still another aspect of the present invention, there is provided a display according to any one of the above aspects in which a ratio $W_B1/W_B2$ between a width $W_B1$ of the first strip-shaped parts and a width $W_B2$ of the second strip-shaped parts is in a range of 1/4 to 2/1. The ratio $W_B1/W_B2$ is preferably in a range of 1/4 to 1/1, and more preferably in a range of 1/2 to 3/4.

By increasing the ratio $W_B1/W_B2$, not only an image derived from the relief structure but also a reflected light image corresponding to the transmitted light image may also be seen under the first observation condition. By decreasing the ratio $W_B1/W_B2$, the reflected light image corresponding to the transmitted light image can be made difficult to see under the first observation condition.

According to still another aspect of the present invention, there is provided a display according to any one of the above aspects in which a partially concealed image is produced by partially concealing the transmitted light image by the mask layer, and at least one of a color and a shape of the partially concealed image changes when tilting the display about an axis parallel to a length direction of the first and second strip-shaped parts.

When a tilt angle of the display is changed under the second observation condition, the position of a portion of the transmitted light image concealed by the mask layer changes. Therefore, the image display layer can be configured, for example, so that the display displays a first partially concealed image as a partially concealed image when the tilt angle is a first angle under the second observation condition, and the display displays a second partially concealed image different from the first partially concealed image as a partially concealed image when the tilt angle is a second angle different from the first angle under the second observation condition. Accordingly, more special images can be displayed.

According to still another aspect of the present invention, there is provided a display according to any one of the above aspects in which the transmitted light image produces moiré when partially concealed by the mask layer.

One or more colored portions included in the image display layer can include a periodically arranged pattern. For example, when the pattern is a strip pattern arranged in the width direction, and the length direction and the width direction of the pattern are the same as the length direction and the width direction of the first or second strip-shaped parts, and the arrangement period of the stripe pattern is shifted from the arrangement period of the first or second strip-shaped parts, moiré can be produced due to the transmitted light image being concealed by the mask layer. Alternatively, when the arrangement direction of the above stripe pattern is inclined relative to the arrangement direction of the first or second strip-shaped parts, moiré can also be produced due to the transmitted light image being concealed by the mask layer.

According to still another aspect of the present invention, there is provided a display according to any one of the above aspects further including a reflective layer that covers the first major surface.

Providing a reflective layer increases the optical effect exerted by the relief structure, for example, light scattering or light deflection efficiency. This enhances the visibility of an image derived from the relief structure under the first observation condition, for example. Further, providing a reflective layer increases the effect of the mask layer concealing a portion of the transmitted light image corresponding to the second strip-shaped parts under the second observation condition.

According to still another aspect of the present invention, there is provided a display according to above aspect in which the reflective layer includes a metal layer, and a portion of the metal layer corresponding to at least one of the one or more regions has a plurality of slits that extend in a length direction of the first strip-shaped parts at positions of the first strip-shaped parts.

Providing a reflective layer including a metal layer further increases the optical effect exerted by the relief structure, for example, light scattering or light deflection efficiency compared with the case where a reflective layer does not include a metal layer. This further enhances the visibility of an image derived from the relief structure under the first observation condition, for example. Further, the effect of the mask layer concealing a portion of the transmitted light image corresponding to the second strip-shaped parts is further enhanced under the second observation condition.

According to still another aspect of the present invention, there is provided a display according to any one of the above aspects in which the relief structure is a scattering structure in at least one of the one or more regions.

When the relief structure is a scattering structure, it is easy to brightly display an image derived from the relief structure in a wide angular range under the first observation condition. As the image derived from the relief structure is brightly displayed under the first observation condition, a reflected light image corresponding to the transmitted light image becomes difficult to see.

According to still another aspect of the present invention, there is provided a display according to any one of the above aspects in which the relief structure is an anisotropic scattering structure composed of a plurality of grooves arranged in a width direction in at least one of the one or more regions.

As described above, the anisotropic scattering structure is formed of a plurality of grooves arranged in the width direction. In these grooves, at least one of the distance between the center lines and the width may be random, for example. As a result, the anisotropic scattering structure exhibits higher light scattering properties in a direction perpendicular to the length direction of the grooves, and exhibits lower light scattering properties in a direction perpendicular to the arrangement direction of the grooves.

Therefore, by rotating the display about an axis parallel to the thickness direction, the region in which an anisotropic scattering structure is provided as the relief structure changes in brightness, for example, under the first observation condition.

According to still another aspect of the present invention, there is provided a display according to the above aspects in which the one or more regions includes two or more regions in which the relief structure is the anisotropic scattering structure, the plurality of grooves have length directions different from each other, and the first and second strip-shaped parts have arrangement directions different from each other.

The above two or more regions are difficult to distinguish from each other under the second observation condition since the arrangement directions of the first and second strip-shaped parts are the same. Further, since the above two or more regions have different length directions of the grooves constituting the anisotropic scattering structure, the rotation angles at which the display appears bright are different when the display is rotated about an axis parallel to the thickness direction under the first observation condition. Therefore, for example, under the first observation condition, the shape of an image derived from the relief structure changes by rotating the display about an axis parallel to the thickness direction.

According to still another aspect of the present invention, there is provided a display according to any one of the above aspects further including a reflective layer that covers the first major surface, wherein the one or more regions include first and second scattering regions in which each of the second strip-shaped parts is provided with a scattering structure as the relief structure, the first major surface further includes first and second flat regions each having a flat surface, the reflective layer includes a metal layer, a first portion of the metal layer corresponding to the first scattering region has a plurality of first slits that extend in a length direction of the first strip-shaped parts at positions of the first strip-shaped parts, a second portion of the metal layer corresponding to the second scattering region has no apertures or has a plurality of slits arranged in a width direction and having a length direction different from that of the plurality of first slits, a third portion of the metal layer corresponding to the first flat region has a plurality of second slits arranged in a width direction, the second slits having a same length direction as that of the plurality of first slits, and a fourth portion of the metal layer corresponding to the second flat region has no apertures or has a plurality of slits arranged in a width direction and having a length direction different from that of the plurality of first slits.

Under the first observation condition, a portion of the display corresponding to a combination of the first and second scattering regions emits scattered light and thus appears bright. On the other hand, a portion corresponding to a combination of the first and second flat regions does not emit scattered light and thus appears dark under the condition under which specularly reflected light is not seen.

Under the second observation condition, a portion of the display corresponding to a combination of the first scattering region and the first flat region appears different in color from the color of a portion corresponding to a combination of the second scattering region and the second flat region. For example, under the second observation condition, a portion of the display corresponding to a combination of the first scattering region and the first flat region appears bright, and a portion corresponding to a combination of the second scattering region and the second flat region appears dark.

Thus, the above display can display more complex images.

Alternatively, according to still another aspect of the present invention, there is provided a display according to any one of the above aspects further including a reflective layer that covers the first major surface, wherein the one or more regions include first to fourth scattering regions in which each of the second strip-shaped parts is provided with an anisotropic scattering structure as the relief structure, the anisotropic scattering structure being composed of a plurality of grooves arranged in a width direction, the first major surface further includes first and second flat regions each having a flat surface, the reflective layer includes a metal layer, a first portion of the metal layer corresponding to the first scattering region has a plurality of first slits that extend in a length direction of the first strip-shaped parts at positions of the first strip-shaped parts, a second portion of the metal layer corresponding to the second scattering region has no apertures or has a plurality of slits arranged in a width direction and having a length direction different from that of the plurality of first slits, a third portion of the metal layer corresponding to the first flat region has a plurality of second slits arranged in a width direction, the second slits having a same length direction as that of the plurality of first slits, a fourth portion of the metal layer corresponding to the second flat region has no apertures or has a plurality of slits arranged in a width direction and having a length direction different from that of the plurality of first slits, a fifth portion of the metal layer corresponding to the third scattering region has a plurality of third slits that extend in a length direction of the first strip-shaped parts at positions of the first strip-shaped parts, a sixth portion of the metal layer corresponding to the fourth scattering region has no apertures or has a plurality of slits arranged in a width direction and having a length direction different from that of the plurality of first slits, the first and second scattering regions have the same width direction of the plurality of grooves, and the third and fourth scattering regions have the same width direction of the plurality of grooves, the width direction of the plurality of grooves being different from that of the first and second scattering regions.

Under the first observation condition, for example, when the observation direction is a direction perpendicular to the width direction of the grooves in the third and fourth scattering regions and inclined relative to the length direction of the grooves in the third and fourth scattering regions, a portion of the display corresponding to a combination of the first and second scattering regions emits strong scattered light and thus appears bright. On the other hand, a portion of the display corresponding to a combination of the third and fourth scattering regions does not emit scattered light or only emits weak scattered light and thus appears dark. Further, a portion corresponding to a combination of the first and second flat regions does not emit scattered light and thus appears dark under the condition under which specularly reflected light is not seen.

In addition, under the first observation condition, for example, when the observation direction is a direction perpendicular to the width direction of the grooves in the first and second scattering regions and inclined relative to the length direction of the grooves in the first and second scattering regions, a portion of the display corresponding to a combination of the third and fourth scattering regions emits strong scattered light and thus appears bright. On the other hand, a portion of the display corresponding to a combination of the first and second scattering regions does not emit scattered light or only emits weak scattered light and thus appears dark. Further, a portion corresponding to a combination of the first and second flat regions does not emit scattered light and thus appears dark under the condition under which specularly reflected light is not seen.

Under the second observation condition, a portion of the display corresponding to a combination of the first and third scattering regions and the first flat region appears different in color from the color of a portion corresponding to a combination of the second and fourth scattering regions and the second flat region. For example, under the second observation condition, a portion of the display corresponding to a combination of the first and third scattering regions and the first flat region appears bright, and a portion corresponding to a combination of the second and fourth scattering regions and the second flat region appears dark.

Thus, the above display can also display more complex images.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

First Embodiment

Figure 1:
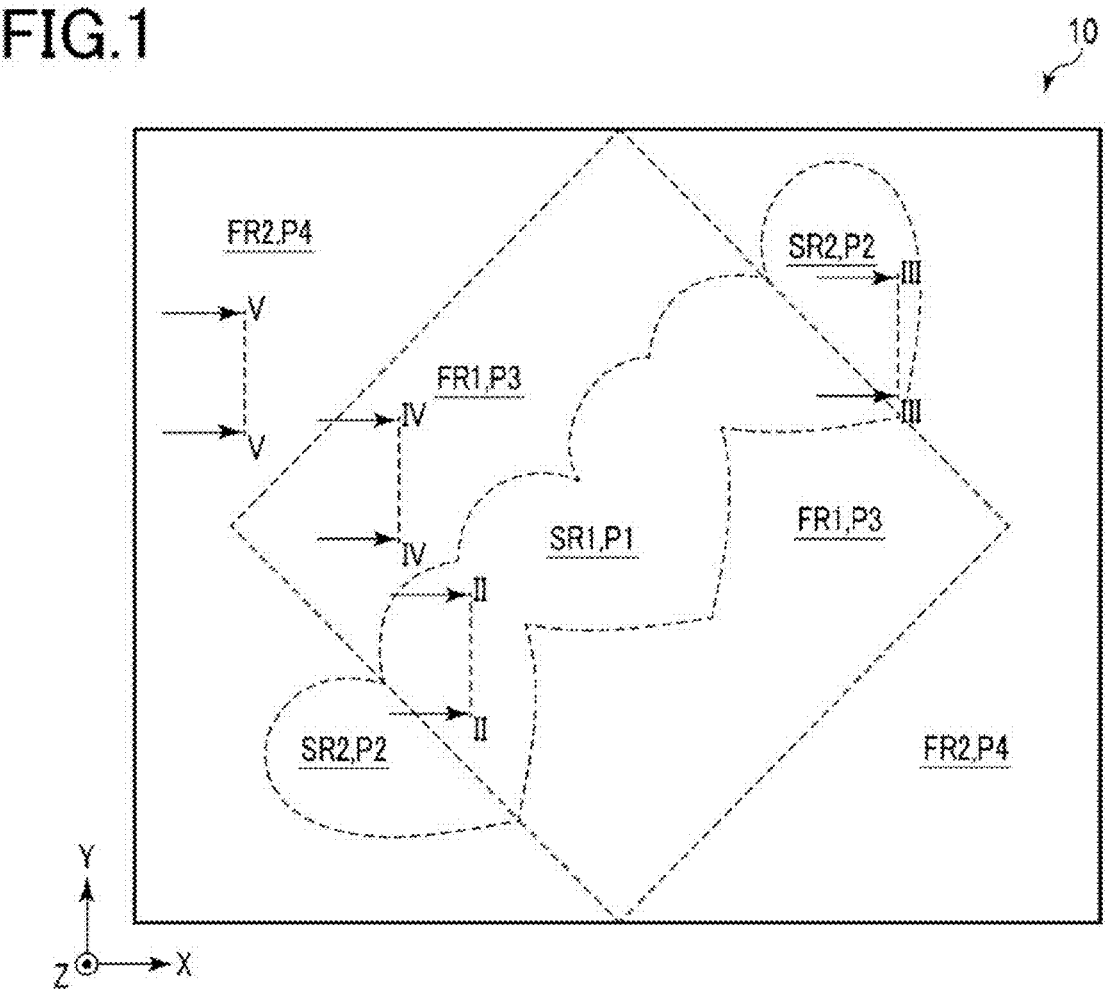
FIG. 1 is a plan view schematically illustrating a mask layer included in a display according to a first embodiment of the present invention.
Figure 2:
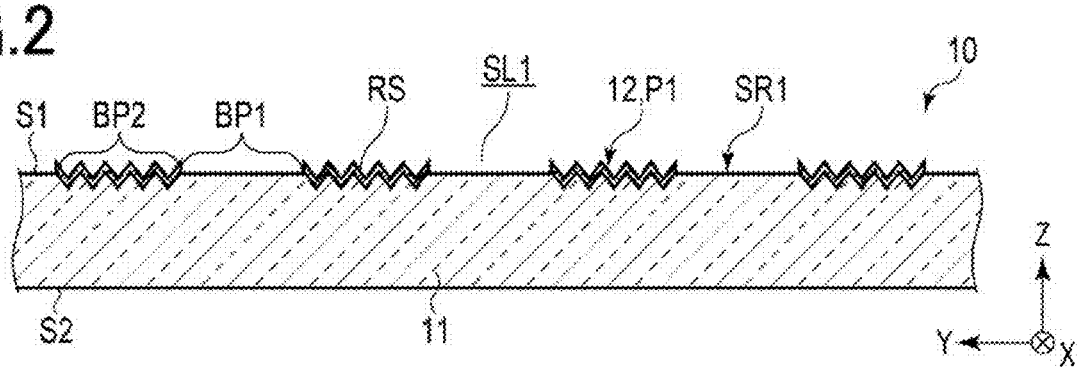
FIG. 2 is a cross-sectional view of the mask layer shown in FIG. 1 taken along the line II-II thereof.
Figure 3:
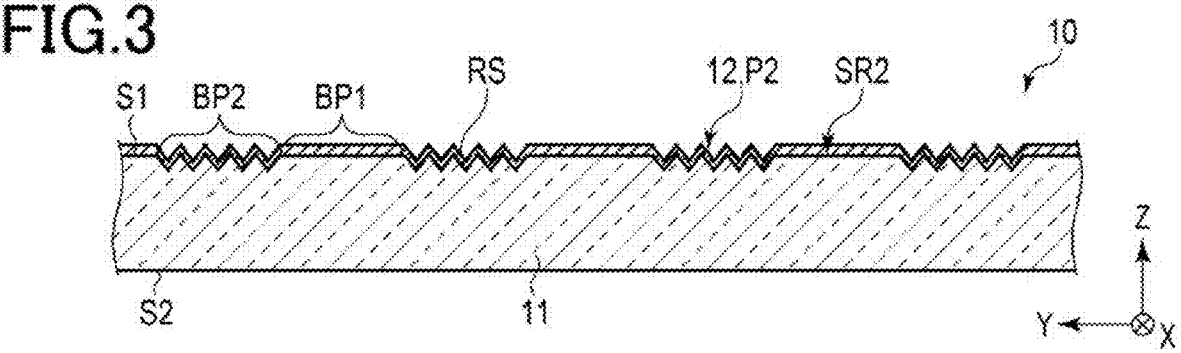
FIG. 3 is a cross-sectional view of the mask layer shown in FIG. 1 taken along the line III-III thereof.
Figure 4:
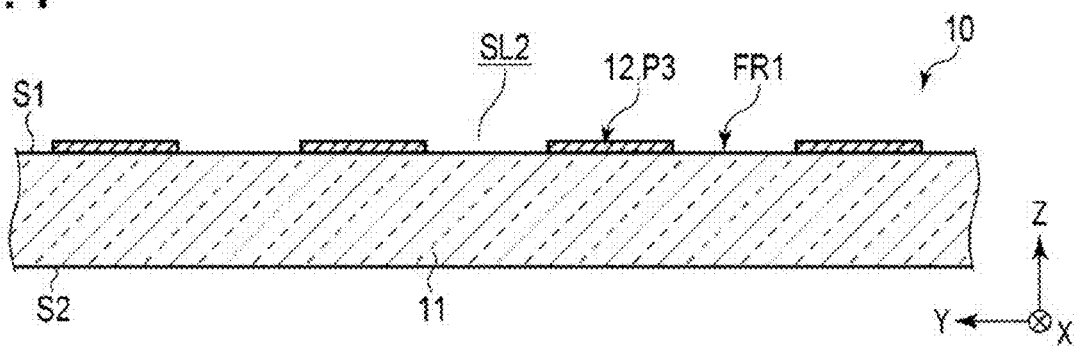
FIG. 4 is a cross-sectional view of the mask layer shown in FIG. 1 taken along the line IV-IV thereof.
Figure 5:
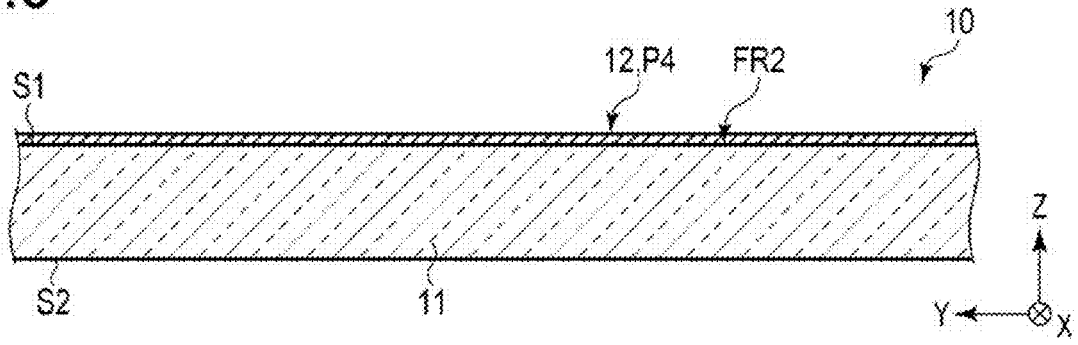
FIG. 5 is a cross-sectional view of the mask layer shown in FIG. 1 taken along the line V-V thereof.

FIG. 1 is a plan view schematically illustrating a mask layer included in a display according to a first embodiment of the present invention. FIG. 2 is a cross-sectional view of the mask layer shown in FIG. 1 taken along the line II-II thereof. FIG. 3 is a cross-sectional view of the mask layer shown in FIG. 1 taken along the line III-III thereof. FIG. 4 is a cross-sectional view of the mask layer shown in FIG. 1 taken along the line IV-IV thereof. FIG. 5 is a cross-sectional view of the mask layer shown in FIG. 1 taken along the line V-V thereof.

Figure 6:
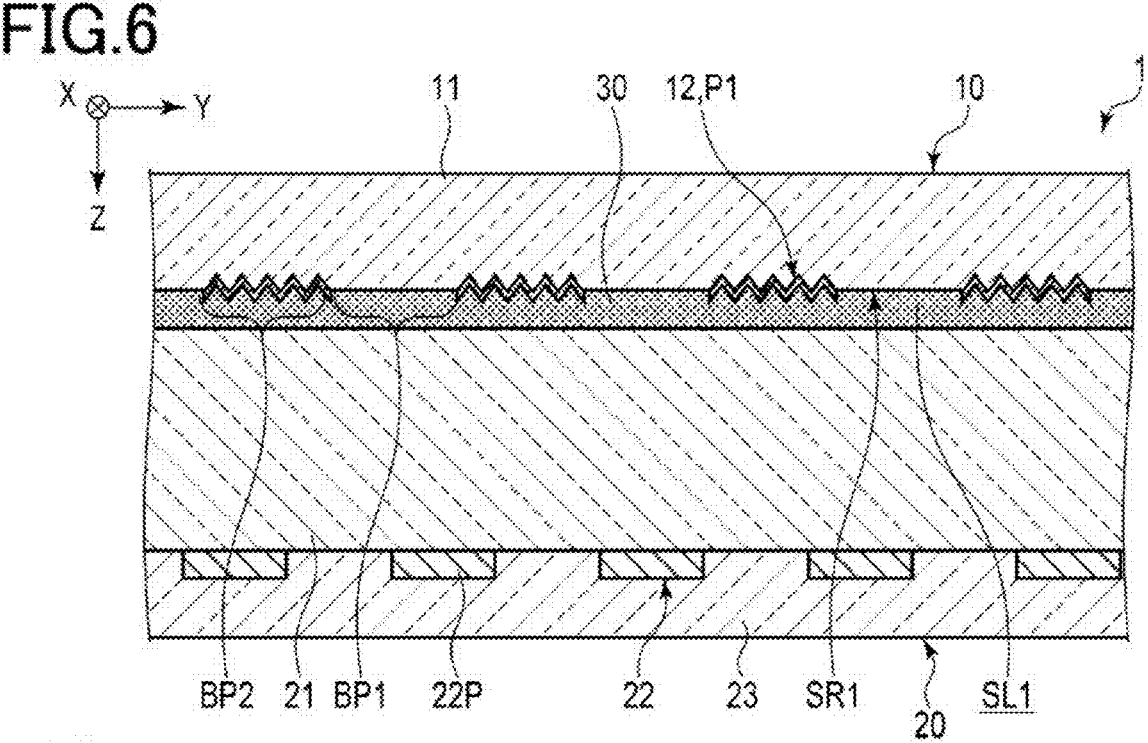
FIG. 6 is a view schematically illustrating a cross-section corresponding to FIG. 2 of a display according to the first embodiment of the present invention.
Figure 7:
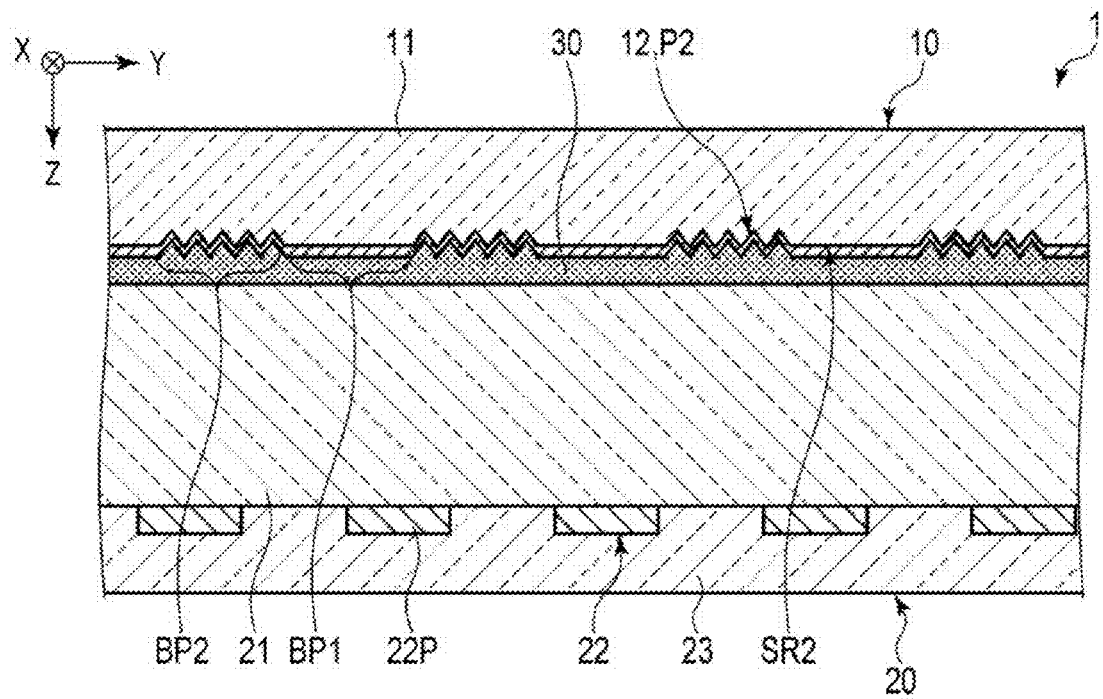
FIG. 7 is a view schematically illustrating a cross-section corresponding to FIG. 3 of a display according to the first embodiment of the present invention.
Figure 8:
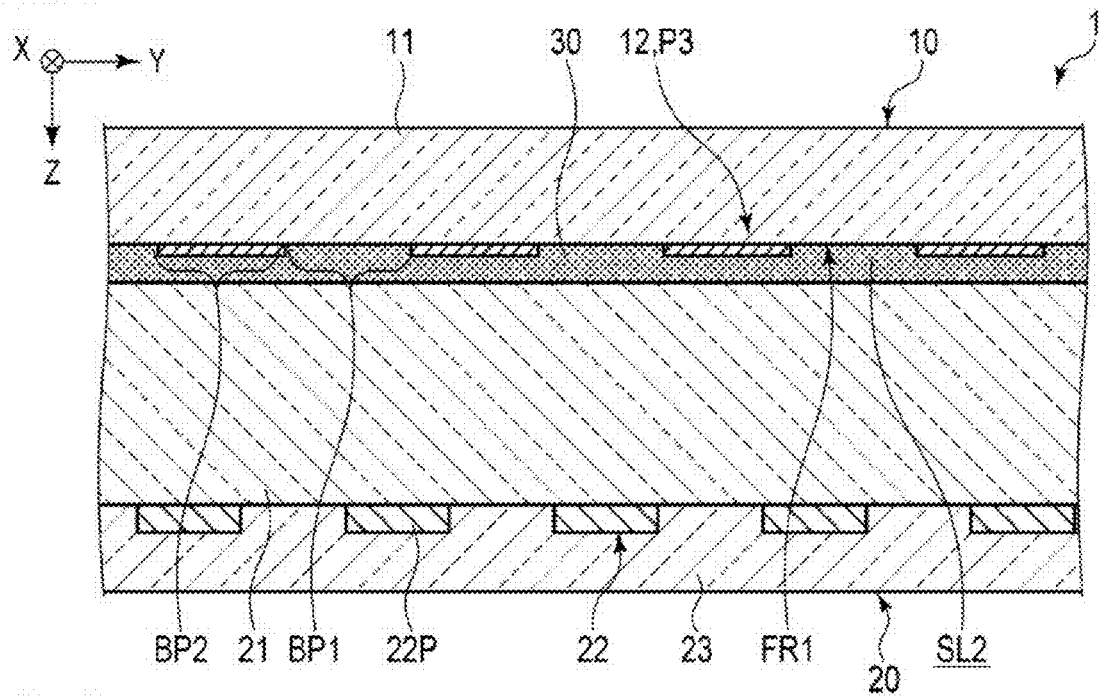
FIG. 8 is a view schematically illustrating a cross-section corresponding to FIG. 4 of a display according to the first embodiment of the present invention.
Figure 9:
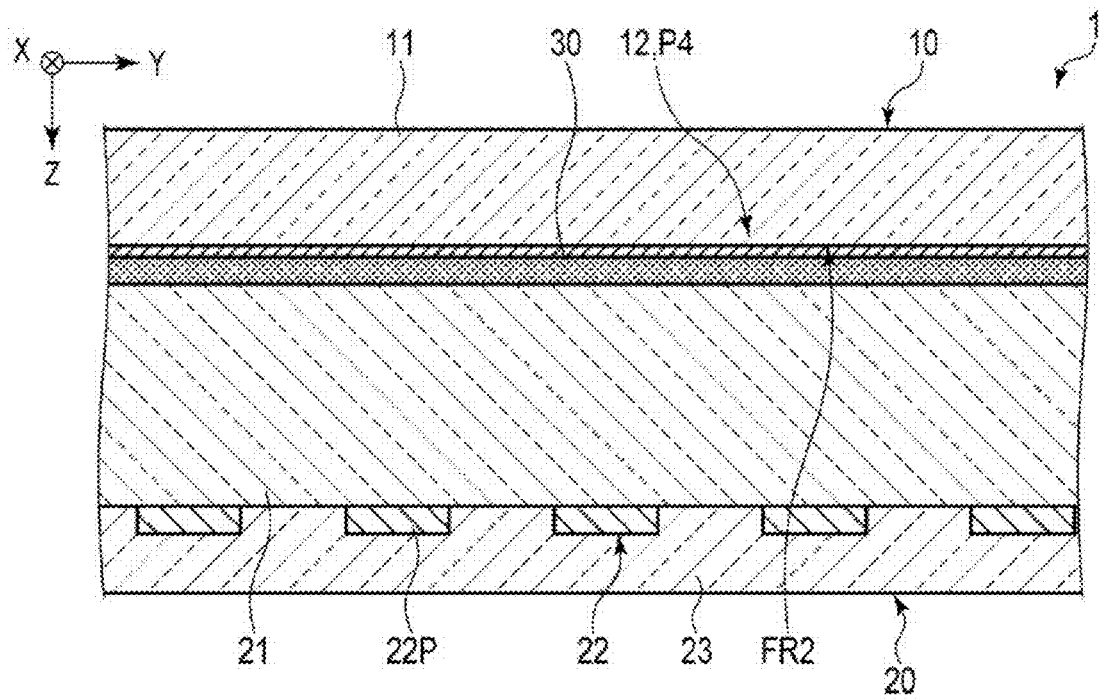
FIG. 9 is a view schematically illustrating a cross-section corresponding to FIG. 5 of a display according to the first embodiment of the present invention.

FIG. 6 is a view schematically illustrating a cross-section corresponding to FIG. 2 of a display according to the first embodiment of the present invention. FIG. 7 is a view schematically illustrating a cross-section corresponding to FIG. 3 of a display according to the first embodiment of the present invention. FIG. 8 is a view schematically illustrating a cross-section corresponding to FIG. 4 of a display according to the first embodiment of the present invention. FIG. 9 is a view schematically illustrating a cross-section corresponding to FIG. 5 of a display according to the first embodiment of the present invention.

In each drawing, the X direction is a direction parallel to a first major surface, which will be described later, that is, a direction parallel to a display surface of the display. Further, the Y direction is a direction parallel to the first major surface and perpendicular to the X direction, that is, a direction parallel to the display surface and perpendicular to the X direction. The Z direction is a direction perpendicular to the X direction and Y direction, that is, a thickness direction of the display or the mask layer.

A display 1 shown in FIGS. 6 to 9 includes a mask layer 10, an image carrier 20 and an adhesive layer 30.

As shown in FIGS. 2 to 9, the mask layer 10 includes a transparent material layer 11 and a reflective layer 12.

The transparent material layer 11 is transparent to light in the visible range. The transparent material layer 11 is preferably colorless and transparent.

The transparent material layer 11 can be a sheet or a film. The transparent material layer 11 can be a polymer sheet or a polymer film. The transparent material layer 11 may have a monolayer structure or may have a multilayer structure.

Examples of materials for the transparent material layer 11 include polycarbonate resins, acrylic resins, fluorine acrylic resins, silicone acrylic resins, epoxy acrylate resins, polystyrene resins, cycloolefin polymers, methylstyrene resins, fluorene resins, and photocurable resins such as polyethylene terephthalate (PET) and polypropylene; thermosetting resins such as acrylonitrile styrene copolymer resins, phenolic resins, melamine resins, urea resins, and alkyd resins; and thermoplastic resins such as polypropylene resins, polyethylene terephthalate resins and polyacetal resins.

As shown in FIGS. 2 to 5, the transparent material layer 11 includes a first major surface S1 and a second major surface S2. The first major surface S1 includes a relief structure RS, which will be described later. The second major surface S2 may be, for example, a flat surface.

As shown in FIGS. 6 to 9, the first major surface S1 is separated from the image carrier 20. As shown in FIGS. 1 to 5, the first major surface S1 includes a first scattering region SR1, a second scattering region SR2, a first flat region FR1 and a second flat region FR2.

As shown in FIGS. 2 and 3, each of the first scattering region SR1 and the second scattering region SR2 are composed of first strip-shaped parts BP1 and second strip-shaped parts BP2 alternately arranged in the width direction. The first strip-shaped parts BP1 and the second strip-shaped parts BP2 have a length in the X direction. Further, the first strip-shaped parts BP1 and the second strip-shaped parts BP2 have a width in the Y direction.

In each of the first scattering region SR1 and the second scattering region SR2, each first strip-shaped part BP1 has a constant width in the length direction. Further, the width of the first strip-shaped parts BP1 is the same between the first scattering region SR1 and the second scattering region SR2, and the first strip-shaped parts BP1 are arranged in the width direction at a constant pitch with the second strip-shaped part BP2 interposed therebetween. The width and the arrangement pitch of the first strip-shaped parts BP1 are also the same between the first scattering region SR1 and the second scattering region SR2. In each of the first scattering region SR1 and the second scattering region SR2, the first strip-shaped parts BP1 are made of a flat surface.

In each of the first scattering region SR1 and the second scattering region SR2, each second strip-shaped part BP2 has a constant width in the length direction. Further, the width of the second strip-shaped parts BP2 is the same between the first scattering region SR1 and the second scattering region SR2, and the second strip-shaped parts BP2 are arranged in the width direction at a constant pitch with the first strip-shaped part BP1 interposed therebetween. The width and the arrangement pitch of the second strip-shaped parts BP2 are also the same between the first scattering region SR1 and the second scattering region SR2.

In each of the first scattering region SR1 and the second scattering region SR2, the second strip-shaped parts BP2 have a relief structure RS. The relief structure RS is a scattering structure that produces isotropic light scattering. Such a scattering structure may be made of, for example, a plurality of protrusions and/or recesses randomly arranged.

As shown in FIG. 1, the first scattering region SR1 and the second scattering region SR2 may be adjacent to each other. In this example, the combination of the first scattering region SR1 and the second scattering region SR2 has a shape of three hearts that are continuous horizontally. The combination of the first scattering region SR1 and the second scattering region SR2 can have a continuous outline.

As shown in FIGS. 4 and 5, the first flat region FR1 and the second flat region FR2 have a flat surface. As shown in FIG. 1, the combination of the first flat region FR1 and the second flat region FR2 may be adjacent to the combination of the first scattering region SR1 and the second scattering region SR2. Specifically, the combination of the first flat region FR1 and the second flat region FR2 may surround the combination of the first scattering region SR1 and the second scattering region SR2.

The combination of the first scattering region SR1 and the first flat region FR1 has a square shape. That is, the outline formed of the first scattering region SR1 and the first flat region FR1 is a square shape. The outline formed of the first scattering region SR1 and the first flat region FR1 is not limited to a square shape, but may be a geometric shape or a mark. The combination of the second scattering region SR2 and the second flat region FR2 has a square aperture. The combination of the second scattering region SR2 and the second flat region FR2 is not limited to a square shape, but may be a geometric shape or a mark.

As shown in FIGS. 2 to 5, the reflective layer 12 covers the first major surface S1.

The reflective layer 12 may be, for example, an inorganic dielectric layer, a metal layer, or a combination thereof.

The reflective layer 12 preferably includes a metal layer. The reflective layer 12 can be a light-shielding metal layer. The metal layer may have a thickness of 20 nm or more and 70 nm or less. With this thickness, a light-shielding metal layer can be provided.

As the material for the metal layer, chromium, nickel, aluminum, iron, titanium, silver, gold or copper can be used. The metal layer can be formed by a vacuum film formation method such as vacuum deposition or sputtering. In other words, the metal layer can be formed by physical deposition. Further, a first slit SL1 and a second slit SL2 described later can be formed by etching.

As shown in FIGS. 1 to 9, the reflective layer 12 includes a first portion P1, a second portion P2, a third portion P3 and a fourth portion P4. The first portion P1, the second portion P2, the third portion P3 and the fourth portion P4 are portions of the reflective layer 12 corresponding to the first scattering region SR1, the second scattering region SR2, the first flat region FR1 and the second flat region FR2, respectively.

As shown in FIGS. 2 and 6, the first portion P1 covers the first scattering region SR1. The first portion P1 includes a plurality of first slits SL1. The first slits SL1 extend in the length direction of the first strip-shaped parts BP1 at the positions of the first strip-shaped parts BP1.

As shown in FIGS. 3 and 7, the second portion P2 covers the second scattering region SR2. The second portion P2 does not have any aperture. That is, the second portion P2 covers the entire second scattering region SR2.

As shown in FIGS. 4 and 8, the third portion P3 covers the first flat region FR1. The third portion P3 includes a plurality of second slits SL2. The length direction and the width direction of the second slits SL2 are the same as the length direction and the width direction of the first slits SL1, respectively.

In this example, the second slits SL2 have the same width as that of the first slits SL1. The second slits SL2 have the same arrangement pitch as that of the first slits SL1. The positions of the second slits SL2 in the arrangement direction are the same as the positions of the first slits SL1 in the arrangement direction.

As shown in FIGS. 5 and 9, the fourth portion P4 covers the second flat region FR2. The fourth portion P4 does not have any aperture. That is, the fourth portion P4 covers the entire second flat region FR2.

Portions of the mask layer 10 corresponding to the first scattering region SR1 and the second scattering region SR2 have light-scattering properties. On the other hand, portions of the mask layer 10 corresponding to the first flat region FR1 and the second flat region FR2 do not have light-scattering properties.

Further, portions of the mask layer 10 corresponding to the first scattering region SR1 and the first flat region FR1 are light transmissive at the positions of the first slits SL1 and the second slits SL2, and light-shielding at other positions. On the other hand, portions of the mask layer 10 corresponding to the second scattering region SR2 and the second flat region FR2 are light-shielding over the entirety thereof.

As shown in FIGS. 6 to 9, the image carrier 20 faces the reflective layer 12. The image carrier 20 and the mask layer 10 may be disposed such that the image carrier 20 faces the second major surface. However, due to the image carrier 20 and the mask layer 10 being disposed such that the image carrier 20 faces the reflective layer 12, the transparent material layer 11 can perform a role as a protective layer that protects the relief structure RS and the reflective layer 12 from damage.

The image carrier 20 includes a transparent substrate 21, an image display layer 22 and a protective layer 23.

The transparent substrate 21 is transparent to light in the visible range. The transparent substrate 21 is preferably colorless and transparent.

The transparent substrate 21 can be a soft substrate such as a sheet or a film, or may be a hard substrate such as a card. The transparent substrate 21 may have a monolayer structure or may have a multilayer structure.

The material for the transparent substrate 21 can be an inorganic material such as glass or an organic material such as a polymer. As the organic material such as a polymer, example materials described for the transparent material layer 11 can be used.

The image display layer 22 is disposed on one of the major surfaces of the transparent substrate 21. The image display layer 22 faces the reflective layer 12 with the transparent substrate 21 interposed therebetween. Such an arrangement is suitable for increasing the distance from the first major surface S1 to the image display layer 22.

The image display layer 22 includes one or more colored portions 22P. In this example, the image display layer 22 is formed of a plurality of colored portions 22P. The colored portions 22P are respectively located on the lattice points of a virtual two-dimensional lattice.

According to one example, one or more colored portions 22P are light-shielding. According to another example, one or more colored portions 22P have higher transmittance in a certain wavelength band within the visible range and lower transmittance in the other wavelength bands within the visible range. In this case, the one or more colored portions 22P may be two or more colored portions having different transmission spectra. As an example, it is assumed the colored portions 22P are black.

The image display layer 22, when illuminated with white light, displays a transmitted light image corresponding to the one or more colored portions 22P. The transmitted light image is an image that appears darker at the positions of the colored portions 22P and brighter at the other positions. The arrangement of the lattice points of the above virtual two-dimensional lattice and the arrangement of the first slits SL1 and the second slits SL2 are designed to produce moiré when the transmitted light image is partially concealed by the mask layer 10.

The image display layer 22 including the colored portions 22P may be formed by, for example, thermal transfer recording using a thermal head, ink jet recording, electrophotography, or a combination of two or more thereof. The image display layer 22 including the colored portions 22P may be formed by micro offset printing. The colored portions 22P of the image display layer 22 thus obtained may contain, for example, at least one of a dye and a pigment. The colored portions 22P can further contain other components such as a binder resin.

The image display layer 22 can be formed on the transparent substrate 21. Alternatively, the image display layer 22 can be formed on the transparent substrate 21 by preparing a transfer foil in which the protective layer 23 and the image display layer 22 are sequentially provided on a support, and transferring a laminate including the protective layer 23 and the image display layer 22 onto the transparent substrate 21 from the support.

An additional image display layer may be provided on the major surface of the transparent substrate 21. According to one example, an additional image display layer may contain at least one of a dye and a pigment. The image display layer can further contain other components such as a binder resin. Such an image display layer can be formed by, for example, thermal transfer recording using a thermal head, ink jet recording, electrophotography, or a combination of two or more thereof. Alternatively, an additional image display layer can be formed by preparing a layer containing a thermosensitive coloring agent, and performing drawing on the layer with a laser beam. Alternatively, an additional image display layer can be formed using a combination of these methods.

The protective layer 23 covers the major surface of the transparent substrate 21 and the image display layer 22. The protective layer 23 protects the image display layer 22 from damage.

The protective layer 23 is transparent to light in the visible range. The protective layer 23 is preferably colorless and transparent. The material for the protective layer 23 can be a polymer. The protective layer 23 can be provided by forming a polymer coat layer on the transparent substrate 21 and the image display layer 22, or by attaching a polymer film or a polymer sheet to the transparent substrate 21 and the image display layer 22.

The adhesive layer 30 is interposed between the mask layer 10 and the image carrier 20. The adhesive layer 30 bonds the mask layer 10 to the image carrier 20 with the reflective layer 12 facing the transparent substrate 21. The adhesive layer 30 is transparent to light in the visible range. The adhesive layer 30 is preferably colorless and transparent. The adhesive layer 30 may have a monolayer structure made of an adhesive or may have a multilayer structure including a layer made of an adhesive and a layer made of an anchor coat agent.

The display 1 displays different images under first to third observation conditions as described below.

Figure 10:
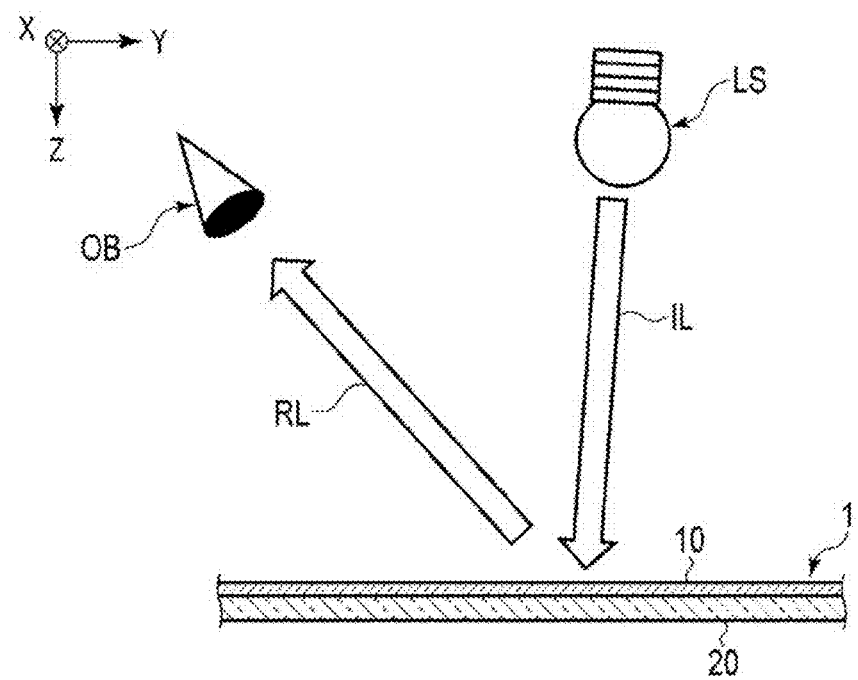
FIG. 10 is a diagram schematically illustrating a first observation condition.
Figure 11:
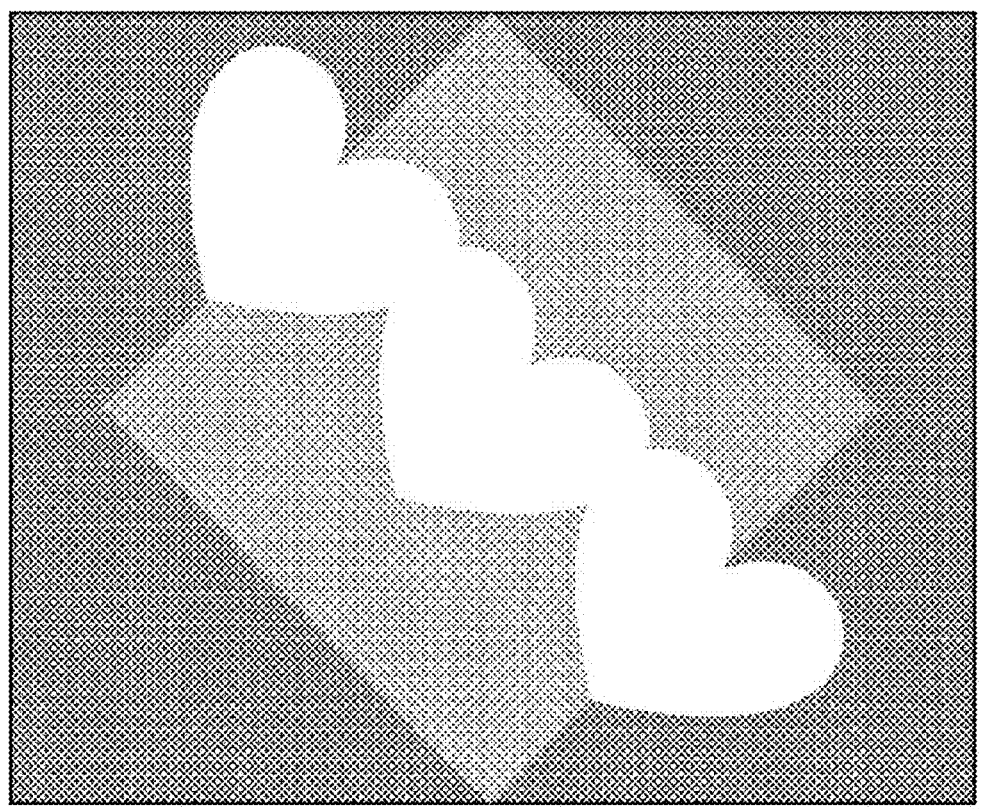
FIG. 11 is a diagram illustrating an example image displayed by the display shown in FIG. 6 to FIG. 9 under the first observation condition.

FIG. 10 is a diagram schematically illustrating a first observation condition. FIG. 11 is a diagram illustrating an example image displayed by the display shown in FIG. 6 to FIG. 9 under the first observation condition.

In the first observation condition, the display 1 is placed on a black surface (not shown) with the image display layer 22 positioned between the black surface and the mask layer 10. That is, the display 1 is placed on the black surface with the image carrier 20 positioned between the black surface and the mask layer 10. Then, as shown in FIG. 10, the mask layer 10 of the display 1 is illuminated with illumination light IL which is white light emitted from a light source LS. An observer OB recognizes, as reflected light RL, the scattered light emitted from the relief structure RS. The illumination direction and the observation direction are adjusted so that the specularly reflected light is not seen by the observer OB.

Under the conditions described above, portions of the display 1 corresponding to the first scattering region SR1 and the second scattering region SR2 emit scattered light. Therefore, these portions appear bright. For example, these portions appear white.

Further, while the first portion P1 includes the first slits SL1, the second portion P2 does not have does not have any aperture. In this example, however, the illumination light IL that has passed through the first slits SL1 is absorbed by the black surface or the colored portions 22P. Therefore, the illumination light IL entering the first slits SL1 does not contribute to display. On the other hand, in the portion of the display 1 corresponding to the second scattering region SR2, portions of the reflective layer 12 corresponding to the first strip-shaped parts BP1 specularly reflect the illumination light IL. As described above, the illumination direction and the observation direction are adjusted so that the specularly reflected light is not seen by the observer OB, so the specularly reflected light also does not contribute display. Therefore, as shown in FIG. 11, the portions of the display 1 corresponding to the first scattering region SR1 and the second scattering region SR2 appear to have substantially the same brightness.

Furthermore, under the conditions described above, portions of the display 1 corresponding to the first flat region FR1 and the second flat region FR2 emit specularly reflected light. As described above, the illumination direction and the observation direction are adjusted so that the specularly reflected light is not seen by the observer OB. Therefore, these portions appear dark. For example, these portions appear black.

Further, while the fourth portion P4 does not have any aperture, the third portion P3 includes the second slits SL2. In this example, however, the illumination light IL that has passed through the second slit SL2 is absorbed by the black surface or the colored portions 22P. When absorption of the illumination light IL by the black surface and the colored portions 22P is insufficient, the portion of the display 1 corresponding to the first flat region FR1 appears brighter than the portion of the display 1 corresponding to the second flat region FR2 as shown in FIG. 11. On the other hand, when absorption of the illumination light IL by the black surface and the colored portions 22P is sufficient, the portion of the display 1 corresponding to the first flat region FR1 and the portion of the display 1 corresponding to the second flat region FR2 appear to have substantially the same brightness.

Figure 12:
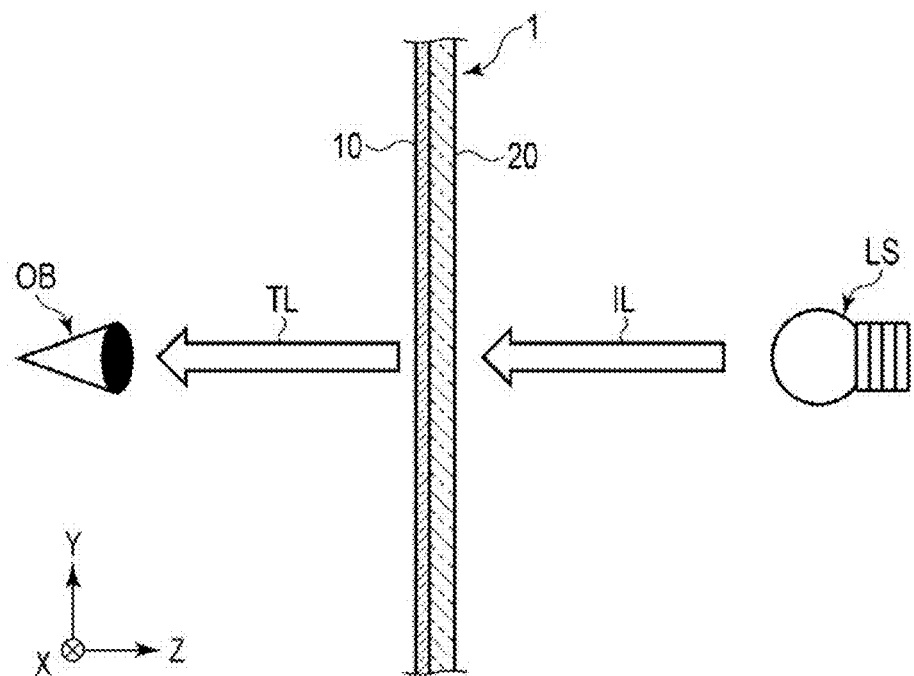
FIG. 12 is a diagram schematically illustrating a second observation condition.
Figure 13:
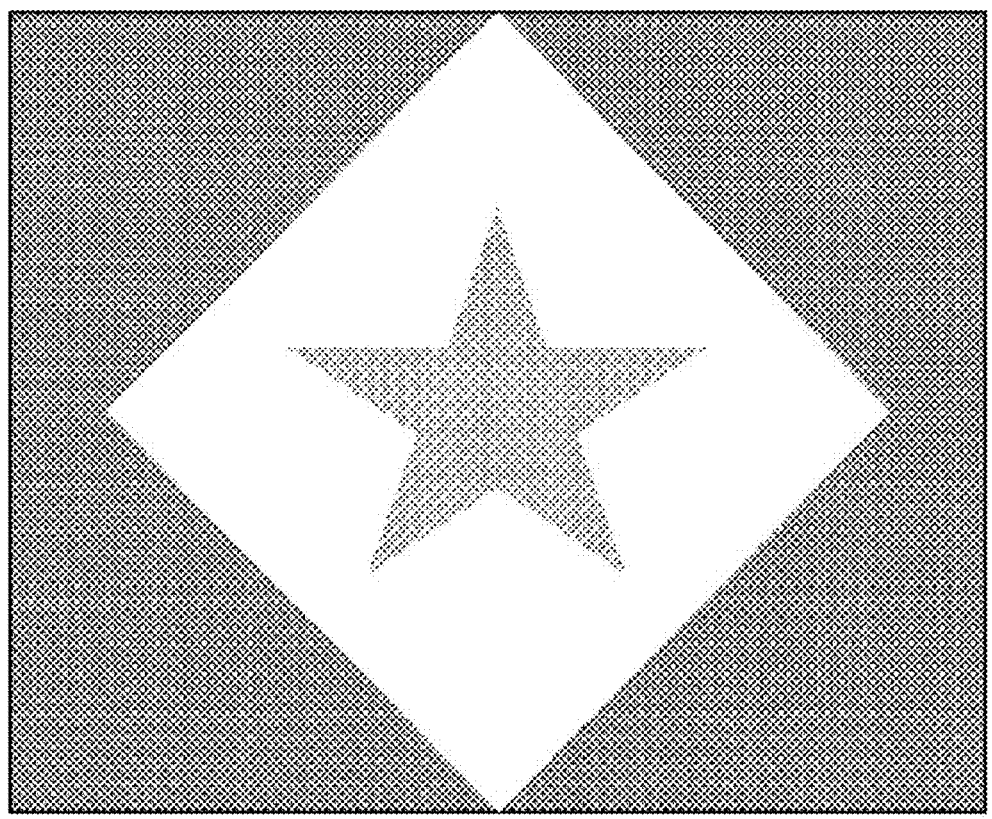
FIG. 13 is a diagram illustrating an example image displayed by the display shown in FIG. 6 to FIG. 9 under the second observation condition.
Figure 14:
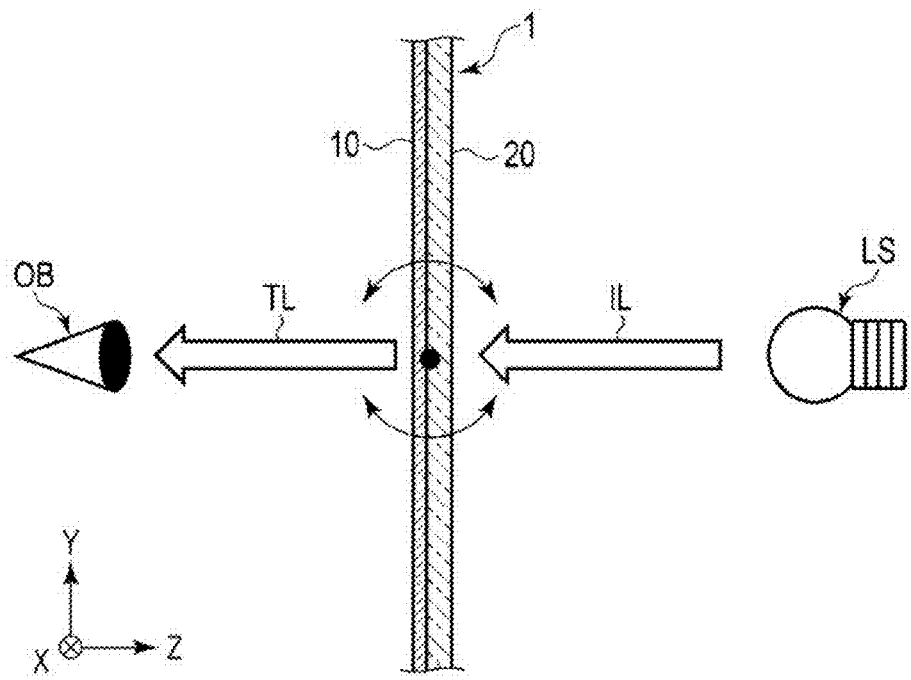
FIG. 14 is a diagram illustrating how the display is tilted under the second observation condition.

FIG. 12 is a diagram schematically illustrating a second observation condition. FIG. 13 is a diagram illustrating an example image displayed by the display shown in FIG. 6 to FIG. 9 under the second observation condition. FIG. 14 is a diagram illustrating how the display is tilted under the second observation condition.

In the second observation condition, the mask layer 10 or the image display layer 22 of the display 1 is illuminated with white light. For example, as shown in FIG. 12, the image carrier 20 of the display 1 is illuminated with illumination light IL which is white light emitted from a light source LS. The observer OB observes transmitted light TL.

The first portion P1 and the third portion P3 include the first slits SL1 and the second slits SL2, respectively. Therefore, portions of the display 1 corresponding to the first portion P1 and the third portion P3 display an image in which the transmitted light image is partially concealed by the mask layer 10.

Further, portions of the display 1 corresponding to the second portion P2 and the fourth portion P4 are light-shielding. Therefore, under the conditions described above, these portions appear dark as shown in FIG. 13. For example, these portions appear black.

Thus, under the second observation condition, the display 1 displays a partially concealed image in which the transmitted light image is partially concealed by the mask layer 10. In this partially concealed image, for example, moiré can be produced. In FIG. 13, a partially concealed image in which moiré is produced is illustrated as a shape including a star pattern.

As described above, the partially concealed image displayed by the display 1 under the second observation condition is different from the image displayed by the display 1 under the first observation condition. Further, tilting the display 1 causes a change in the shape and position of the moiré pattern in the partially concealed image displayed by the display 1 under the second observation condition. That is, slightly rotating the display 1 about the axis parallel to the X direction under the second observation condition as shown in FIG. 14 causes a change in the position of a portion of the transmitted light image concealed by the mask layer 10. As a result, the shape and position of the moiré pattern change.

In the third observation condition, the display 1 is placed on a white surface with the mask layer 10 positioned between the white surface and the image display layer 22. Then, the image display layer 22 of the display 1 is illuminated. As illumination light, white diffused light is used. The observer observes a reflected light image. The illumination direction and the observation direction are adjusted so that the specularly reflected light is seen by the observer.

Under this observation condition, the illumination light is absorbed by the colored portions 22P at portions corresponding to the colored portions 22P, and is reflected by the white surface or reflected or scattered by the reflective layer 12 at the other portions. Therefore, the portions of the display 1 corresponding to the colored portions 22P appear dark, and the other portions appear bright. As a result, the observer can see the reflected light image corresponding to the above transmitted light image.

As described above, the partially concealed image displayed by the display 1 under the third observation condition is different from the image displayed by the display 1 under the first or second observation condition.

Thus, the above display 1 displays different images under the first to third observation conditions. That is, the display 1 can display special images.

Further, the partially concealed image displayed by the display 1 under the second observation condition is different from the images displayed by the display 1 under the first and third observation conditions. While the first and third observation conditions are conditions under which reflected light is observed, the second observation condition is a condition under which transmitted light is observed. That is, the second observation condition is a special observation condition. Therefore, the partially concealed image can serve as a latent image.

Further, tilting the display 1 can cause a change in the shape and position of the moiré pattern in the image displayed by the display 1 under the second observation condition.

Second Embodiment

Figure 15:
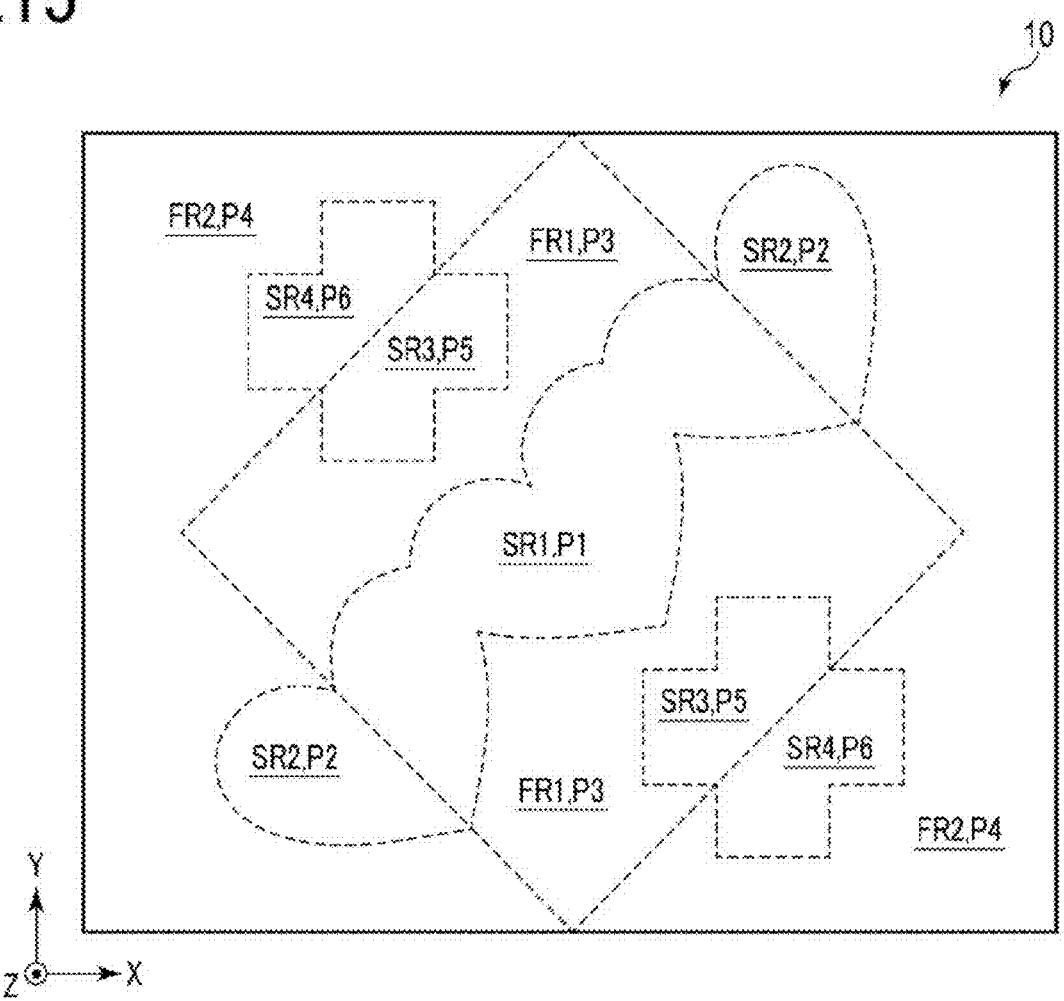
FIG. 15 is a plan view schematically illustrating a mask layer included in a display according to a second embodiment of the present invention.
Figure 16:
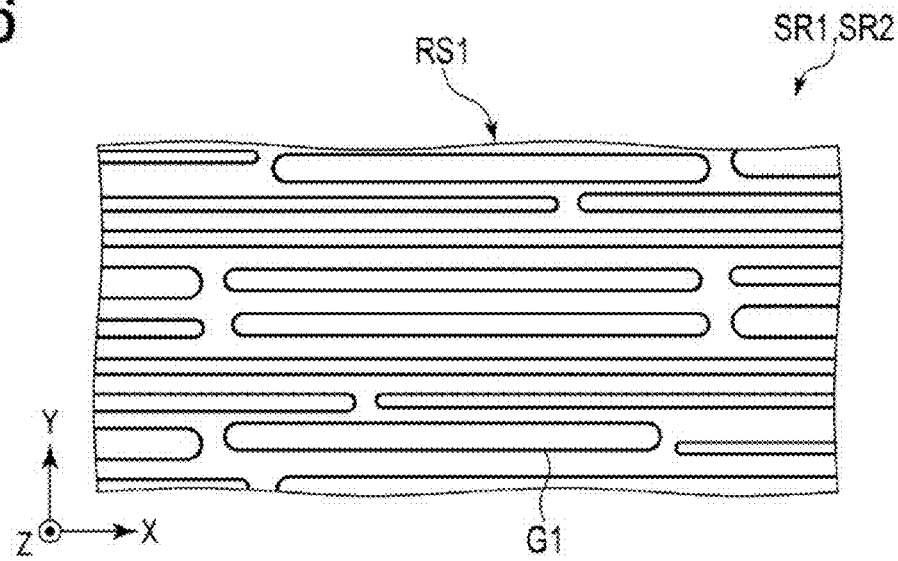
FIG. 16 is a plan view illustrating an example structure that can be employed as an anisotropic scattering structure in the first and second scattering regions of the mask layer shown in FIG. 15.
Figure 17:
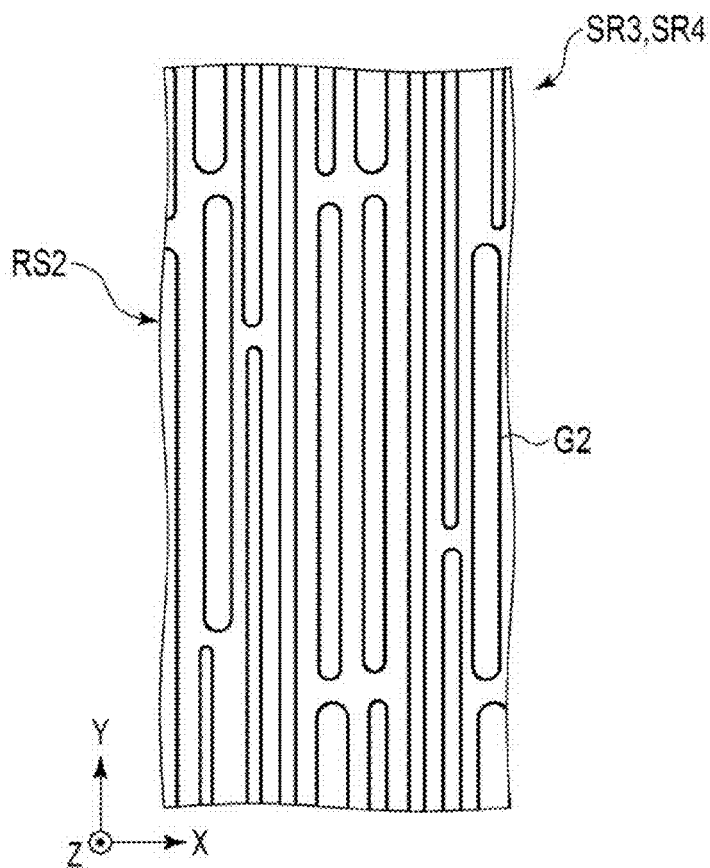
FIG. 17 is a plan view illustrating an example structure that can be employed as an anisotropic scattering structure in the third and fourth scattering regions of the mask layer shown in FIG. 15.

FIG. 15 is a plan view schematically illustrating a mask layer included in a display according to a second embodiment of the present invention. FIG. 16 is a plan view illustrating an example structure that can be employed as an anisotropic scattering structure in the first and second scattering regions of the mask layer shown in FIG. 15. FIG. 17 is a plan view illustrating an example structure that can be employed as an anisotropic scattering structure in the third and fourth scattering regions of the mask layer shown in FIG. 15.

The display according to the second embodiment is the same as the display 1 according to the first embodiment except that the following configuration is employed.

That is, the first major surface S1 of the transparent material layer 11 further includes a third scattering region SR3 and a fourth scattering region SR4. In the third scattering region SR3 and the fourth scattering region SR4, a relief structure is provided.

The relief structures provided in the first scattering region SR1, the second scattering region SR2, the third scattering region SR3 and the fourth scattering region SR4 are not scattering structures that cause isotropic light scattering, but anisotropic scattering structures that cause anisotropic light scattering.

In the first scattering region SR1 and the second scattering region SR2, a first anisotropic scattering structure RS1 shown in FIG. 16 is provided as a relief structure. The first anisotropic scattering structure RS1 is formed of a plurality of first grooves G1 arranged in the width direction. The first grooves G1 has a length in the X direction and a width in the Y direction. In these first groove G1, at least one of the distance between the center lines and the width is random. The first anisotropic scattering structure RS1 emits strong scattered light in a direction perpendicular to the length direction of the first grooves G1, and does not emit scattered light or only emits weak scattered light in a direction that is parallel to the length direction of the first grooves G1 and inclined relative to the first major surface S1.

In the third scattering region SR3 and the fourth scattering region SR4, a second anisotropic scattering structure RS2 shown in FIG. 17 is provided as a relief structure. The second anisotropic scattering structure RS2 is formed of a plurality of second grooves G2 arranged in the width direction. The second grooves G2 has a length in the Y direction and a width in the X direction. In these second grooves G2, at least one of the distance between the center lines and the width is random. The second anisotropic scattering structure RS2 emits strong scattered light in a direction perpendicular to the length direction of the second grooves G2, and does not emit scattered light or only emits weak scattered light in a direction that is parallel to the length direction of the second grooves G2 and inclined relative to the first major surface S1.

The reflective layer 12 further includes a fifth portion P5 and a sixth portion P6 in addition to the first portion P1, the second portion P2, the third portion P3 and the fourth portion P4. The fifth portion P5 and the sixth portion P6 are portions of the reflective layer 12 corresponding to the third scattering region SR3 and the fourth scattering region SR4, respectively.

The fifth portion P5 covers the third scattering region SR3. The fifth portion P5 includes a plurality of third slits (not shown). The length direction, arrangement direction, width and pitch of the third slits are the same as those of the first slits SL1 and the second slits SL2.

The sixth portion P6 covers the fourth scattering region SR4. The sixth portion P6 does not have any aperture.

The above display displays an image described below.

Figure 18:
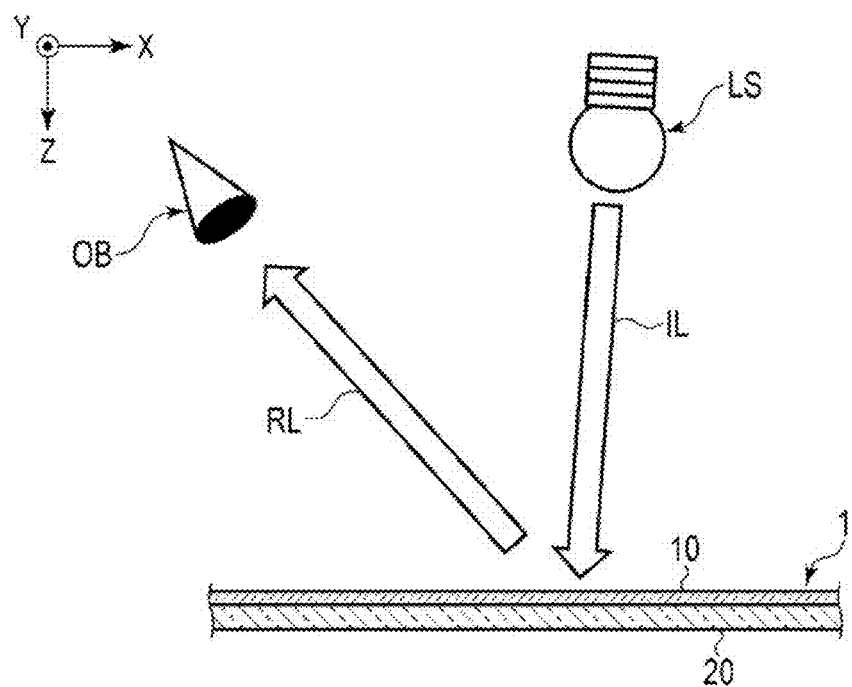
FIG. 18 is a diagram illustrating the display that has been rotated by 90° from the state shown in in FIG. 12.
Figure 19:
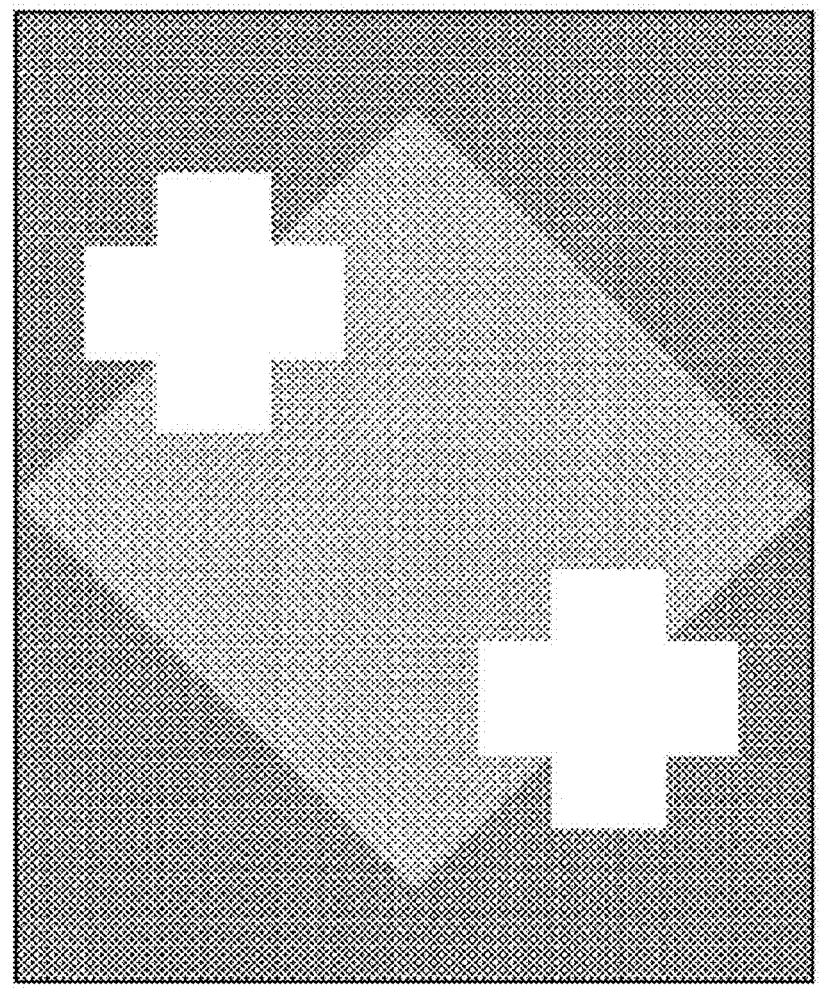
FIG. 19 is a diagram illustrating an example image displayed by the display according to the second embodiment of the present invention under the observation condition shown in FIG. 18.

FIG. 18 is a diagram illustrating the display that has been rotated by 90° from the state shown in in FIG. 12. FIG. 19 is a diagram illustrating an example image displayed by the display according to the second embodiment of the present invention under the observation condition shown in FIG. 18.

When the display according to the second embodiment is observed under the first observation condition shown in FIG. 10, that is, when the observation direction is perpendicular to the X direction and inclined relative to the display surface, portions of the display 1 corresponding to the first scattering region SR1 and the second scattering region SR2 emit strong scattered light and thus appear bright. On the other hand, portions of the display 1 corresponding to the third scattering region SR3 and the fourth scattering region SR4 do not emit scattered light or only emit weak scattered light and thus appear dark. Further, portions of the display 1 corresponding to the first flat region FR1 and the second flat region FR2 do not emit scattered light and thus appear dark under the condition under which the specularly reflected light is not seen. Therefore, under this observation condition, the display 1 displays an image described above referring to FIG. 11.

When the display 1 is rotated by 90° about an axis parallel to the Z direction as shown in FIG. 18 under the observation condition shown in FIG. 10, the portions of the display 1 corresponding to the first scattering region SR1 and the second scattering region SR2 do not emit scattered light or only emit weak scattered light and thus appear dark. On the other hand, the portions of the display 1 corresponding to the third scattering region SR3 and the fourth scattering region SR4 emit strong scattered light and thus appear bright. Further, portions of the display 1 corresponding to the first flat region FR1 and the second flat region FR2 do not emit scattered light and thus appear dark under the condition under which the specularly reflected light is not seen. Therefore, under this observation condition, the display 1 may display, for example, an image shown in FIG. 19.

When the display 1 according to the second embodiment is observed under the second observation condition, the display 1 displays the same image as that displayed by the display 1 according to the first embodiment under the second observation condition.

When the display 1 according to the second embodiment is observed under the third observation condition, the display 1 displays the same image as that displayed by the display 1 according to the first embodiment under the third observation condition.

Thus, the display 1 according to the second embodiment also displays different images under the first to third observation conditions. That is, the display 1 can display special images. Further, a partially concealed image displayed by the display 1 according to the second embodiment under the second observation condition can also serve as a latent image. Moreover, tilting the display 1 can cause a change in the shape and position of the moiré pattern in the image displayed by the display 1 according to the second embodiment under the second observation condition.

Further, an image displayed by the display 1 according to the second embodiment under the first observation condition changes by rotating the display 1 about an axis parallel to the thickness direction.

That is, the display 1 can display special and complex images.

First Modified Example

Figure 20:
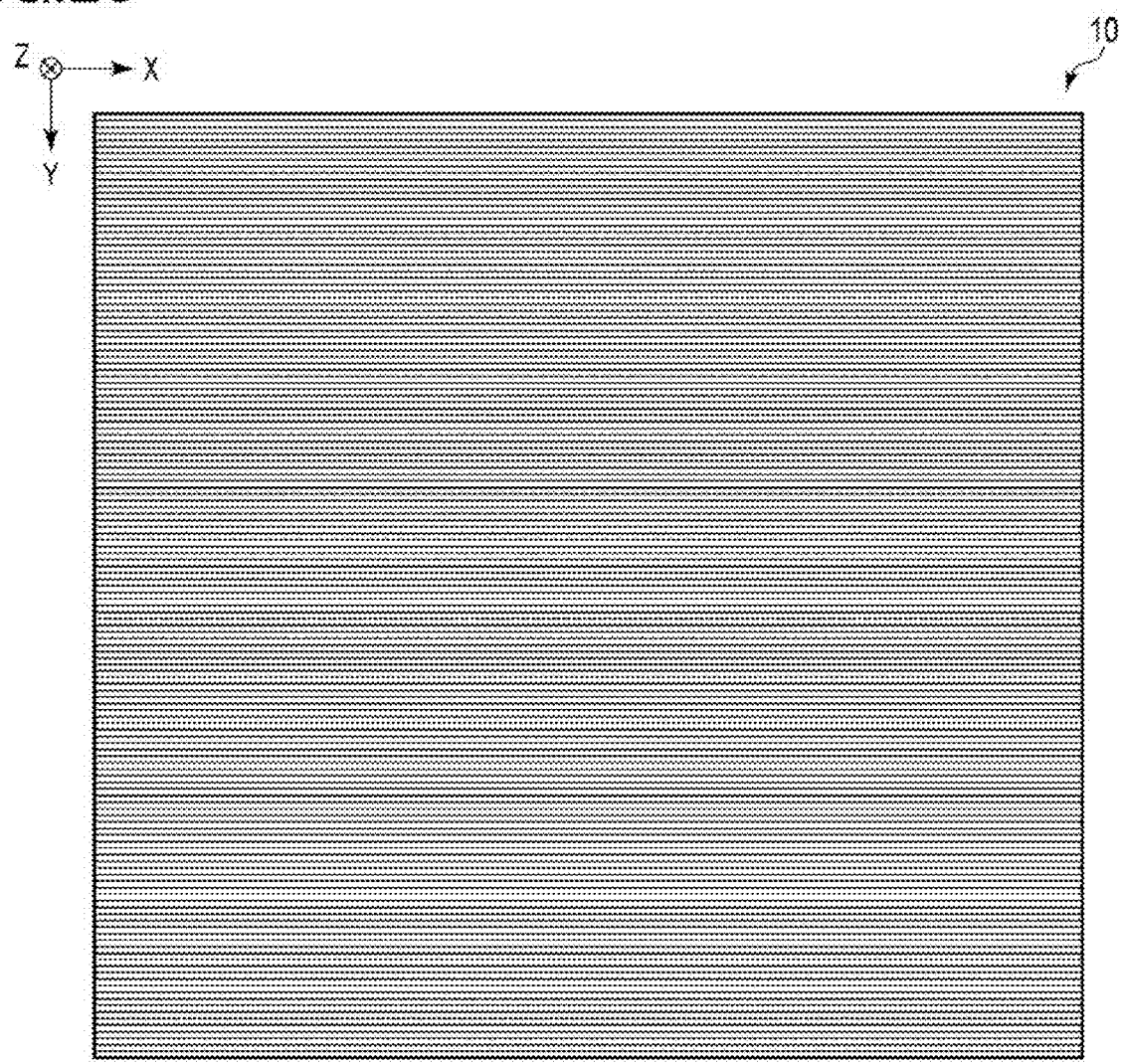
FIG. 20 is a plan view schematically illustrating an example structure that can be employed for the mask layer.
Figure 21:
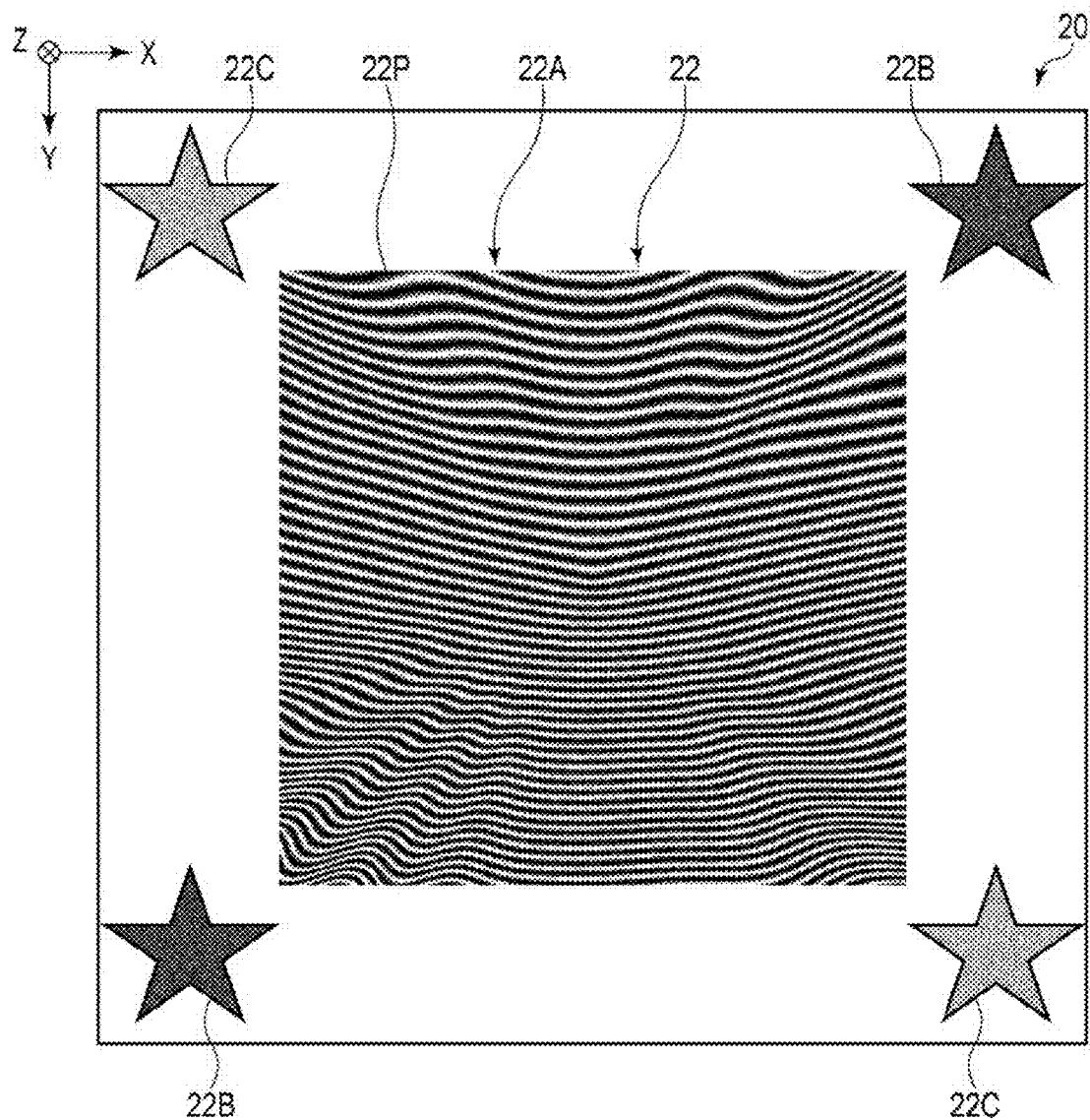
FIG. 21 is a plan view schematically illustrating an example structure that can be employed for the image carrier.
Figure 22:
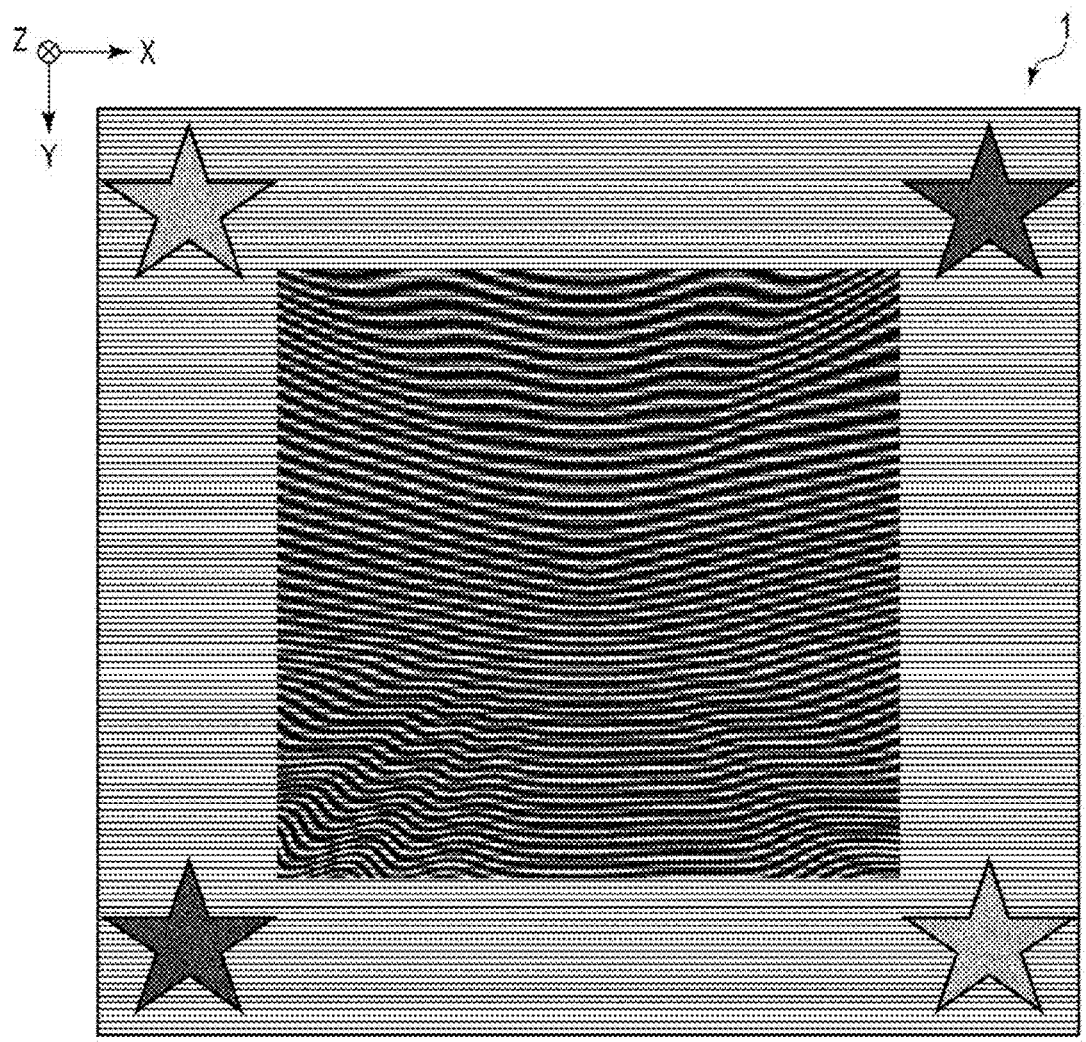
FIG. 22 is a plan view schematically illustrating an example in which a display having the mask layer of FIG. 20 and the image display layer of FIG. 21 displays an image under the second observation condition.

With reference to FIGS. 20 to 22, a first modified example will be described.

FIG. 20 is a plan view schematically illustrating an example structure that can be employed for the mask layer. FIG. 21 is a plan view schematically illustrating an example structure that can be employed for the image carrier. FIG. 22 is a plan view schematically illustrating an example in which a display having the mask layer of FIG. 20 and the image carrier of FIG. 21 displays an image under the second observation condition.

The display 1 according to the first modified example is the same as the display 1 according to the first embodiment except that the mask layer 10 and the image carrier 20 employs the structures shown in FIG. 20 and FIG. 21, respectively.

The mask layer 10 of FIG. 20 is the same as the mask layer 10 of the display 1 according to the first embodiment except that the first major surface S1 does not include any of the second scattering region SR2, the first flat region FR1 and the second flat region FR2, and the reflective layer 12 does not include any of the second portion P2, the third portion P3 and the fourth portion P4.

That is, in the mask layer 10 of FIG. 20, the first strip-shaped parts BP1 and the second strip-shaped parts BP2, each extending in the X direction, are alternately arranged in the Y direction over the entire first major surface S1. In the second strip-shaped parts BP2, a scattering structure that produces isotropic light scattering is provided as a relief structure RS.

The reflective layer 12, which is a metal layer, covers the first major surface S1. The reflective layer 12 has apertures at the positions of the first strip-shaped parts BP1. That is, the reflective layer 12 has the first slits SL1 each extending in the X direction at the positions of the first strip-shaped parts BP1.

The image carrier 20 of FIG. 21 is the same as the image carrier 20 of the display 1 according to the first embodiment except that the image display layer 22 includes a first image display layer 22A, a second image display layer 22B and a third image display layer 22C.

The first image display layer 22A is formed of a plurality of colored portions 22P. Each colored portion 22P has a curved linear shape. The colored portions 22P have substantially the same width. The colored portions 22P are arranged in the width direction at substantially constant intervals. The colored portions 22P are assumed to be black.

The second image display layer 22B and the third image display layer 22C are solid print layers. The second image display layer 22B and the third image display layer 22C are assumed to be transparent to visible light and have different transmission spectra in the visible range.

Under the first observation condition, the entire display 1 according to the first modified example appears bright. For example, the entire display 1 appears white.

Under the second observation condition, the display 1 displays a partially concealed image shown in FIG. 22. In the partially concealed image, moiré is produced at a position corresponding to the first image display layer 22A. When the display 1 is tilted under the second observation condition as described referring to FIG. 14, the shape and position of the moiré pattern can change.

Under the third observation condition, the display 1 displays an image corresponding to the first image display layer 22A, the second image display layer 22B and the third image display layer 22C shown in FIG. 21.

Thus, the display 1 according to the first modified example also displays different images under the first to third observation conditions. That is, the display 1 can display special images. The partially concealed image displayed by the display 1 under the second observation condition can also serve as a latent image. Further, tilting the display 1 can cause a change in the shape and position of the moiré pattern in the image displayed by the display 1 under the second observation condition.

As described above, an image displayed by the display 1 at the position of the first image display layer 22A includes moiré under the second observation condition, and does not include moiré under the third observation condition. On the other hand, images displayed by the display 1 at the positions of the second image display layer 22B and the third image display layer 22C under the second observation condition are substantially the same as those displayed under the third observation condition. That is, the second image display layer 22B and the third image display layer 22C emphasize a change in image that occurs at the position of the first image display layer 22A.

Second Modified Example

Figure 23:
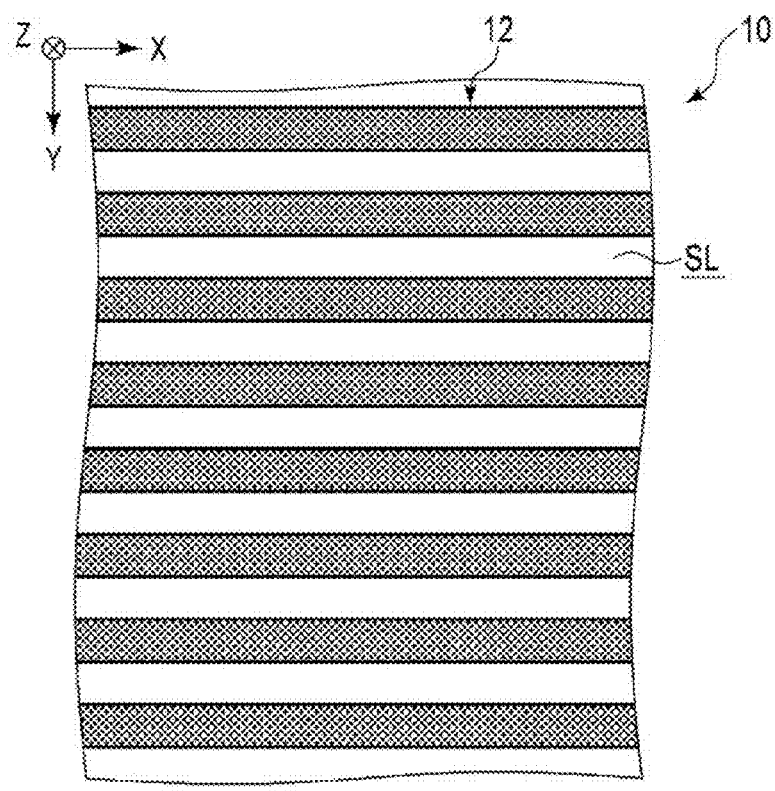
FIG. 23 is a plan view schematically illustrating another example structure that can be employed for the mask layer.
Figure 24:
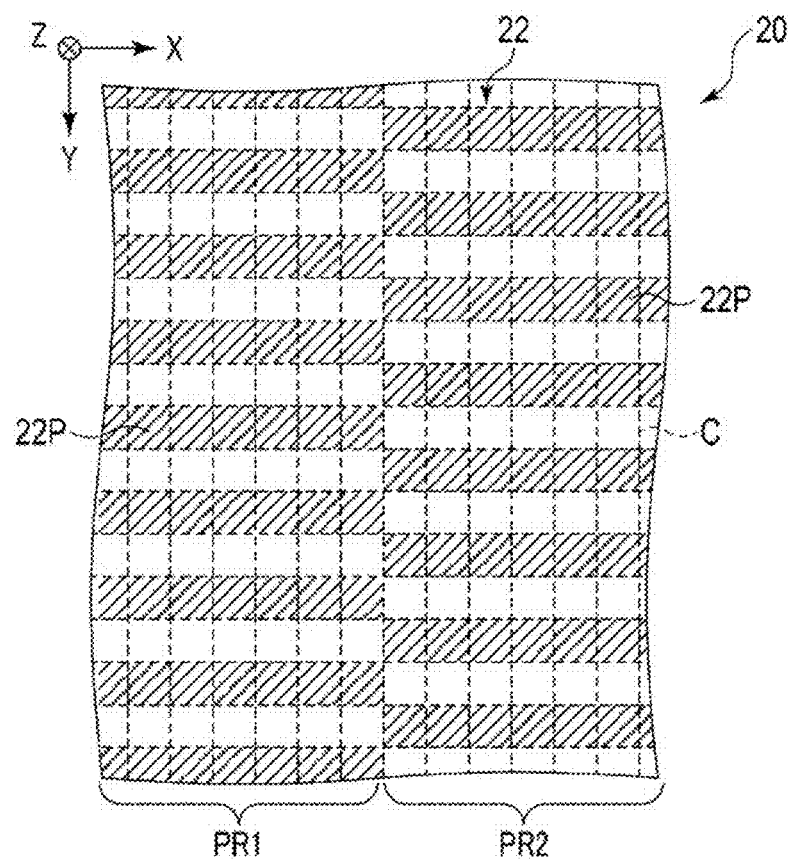
FIG. 24 is a plan view schematically illustrating another example structure that can be employed for the image carrier.
Figure 25:
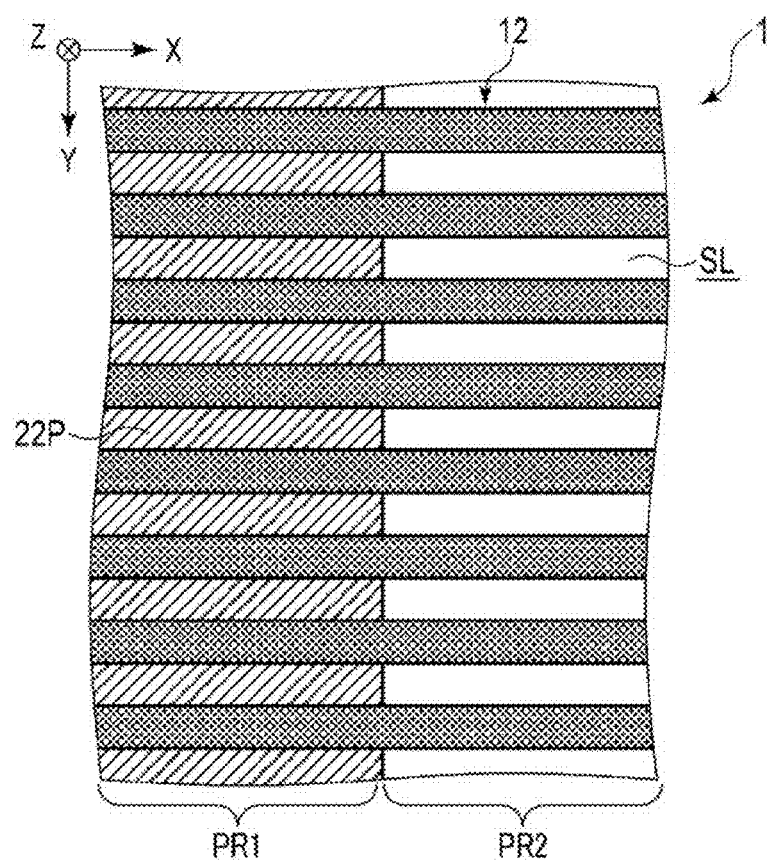
FIG. 25 is a plan view schematically illustrating an example in which a display having the mask layer of FIG. 23 and the image carrier of FIG. 24 displays an image under the second observation condition.

With reference to FIGS. 23 to 25, a second modified example will be described.

FIG. 23 is a plan view schematically illustrating another example structure that can be employed for the mask layer. FIG. 24 is a plan view schematically illustrating another example structure that can be employed for the image carrier. FIG. 25 is a plan view schematically illustrating an example in which a display having the mask layer of FIG. 23 and the image carrier of FIG. 24 displays an image under the second observation condition.

The display 1 according to the second modified example is the same as the display 1 according to the first embodiment except that the mask layer 10 and the image carrier 20 employs the structures shown in FIG. 23 and FIG. 24, respectively.

The mask layer 10 of FIG. 23 is the same as the mask layer 10 of the display 1 according to the first embodiment except that the first major surface S1 does not include any of the second scattering region SR2, the first flat region FR1 and the second flat region FR2, and the reflective layer 12 does not include any of the second portion P2, the third portion P3 and the fourth portion P4.

That is, in the mask layer 10 of FIG. 23, the first strip-shaped parts BP1 and the second strip-shaped parts BP2, each extending in the X direction, are alternately arranged in the Y direction over the entire first major surface S1. In the second strip-shaped parts BP2, a scattering structure that produces isotropic light scattering is provided as a relief structure RS.

The reflective layer 12, which is a metal layer, covers the first major surface S1. The reflective layer 12 has apertures at the positions of the first strip-shaped parts BP1. That is, the reflective layer 12 has the slits SL each extending in the X direction at the positions of the first strip-shaped parts BP1. The slits SL have the same width and the same pitch.

The image carrier 20 of FIG. 24 includes a first display region PR1 and a second display region PR2. Each of the first display region PR1 and the second display region PR2 include a plurality of cells C. These cells C are arranged in the length direction and the width direction of the slits SL. That is, the cells C form a virtual two-dimensional lattice (in this example, a square lattice or a rectangular lattice). The arrangement pitch of the cells C in the width direction of the slits SL is equal to the arrangement pitch of the slits SL.

The colored portions 22P are disposed in the cells C. That is, the colored portions 22P are respectively located on the lattice points of a virtual two-dimensional lattice.

More specifically, in the first display region PR1, the colored portions 22P are not disposed in the cells C in the (2n-1)th row (n is a natural number) among the rows composed of the cells C arranged in the X direction. In the first display region PR1, the respective colored portions 22P are disposed in the cells C in the (2n)th row among the rows composed of the cells C arranged in the X direction.

On the other hand, in the second display region PR2, the colored portions 22P are not disposed in the cells C in the (2n)th row among the rows composed of the cells C arranged in the X direction. In the second display region PR2, the respective colored portions 22P are disposed in the cells C in the (2n-1)th row among the rows composed of the cells C arranged in the X direction.

Except for the above points, the image carrier 20 of FIG. 21 is the same as the image carrier 20 of the display 1 according to the first embodiment.

The colored portions 22P in the first display region PR1 may have the same color or different colors. Similarly, the colored portions 22P in the second display region PR2 may have the same color or different colors. Further, the color of the colored portions 22P in the first display region PR1 may be the same or different from that of the colored portions 22P in the second display region PR2. As an example, it is assumed the colored portions 22P in the first display region PR1 and the second display region PR2 are black.

Further, in the first display region PR1, the colored portions 22P may be disposed in all the cells C in the (2n)th row, or may be disposed in a part of the cells C in the (2n)th row. On the other hand, in the second display region PR2, the colored portions 22P may be disposed in all the cells C in the (2n-1)th row, or may be disposed in a part of the cells C in the (2n-1)th row. As an example, it is assumed that the colored portions 22P are disposed in all the cells C in the (2n)th row in the first display region PR1 and all the cells C in the (2n-1)th row in the second display region PR2.

Under the first observation condition, both the portion corresponding to the first display region PR1 and the portion corresponding to the second display region PR2 in the display 1 according to the second modified example appear bright. For example, both the portion corresponding to the first display region PR1 and the portion corresponding to the second display region PR2 appear white.

Under the second observation condition, for example, as shown in FIG. 25, the mask layer 10 conceals the colored portions 22P in the second display region PR2 without concealing the colored portions 22P in the first display region PR1. As a result, a partially concealed image is displayed in which the portion corresponding to the first display region PR1 appear dark and the portion corresponding to the second display region PR2 appear bright. For example, in the display 1, the portion corresponding to the first display region PR1 appears black and the portion corresponding to the second display region PR2 appears white.

When the display 1 is tilted under the second observation condition as described above referring to FIG. 14, the area of a portion of the colored portions 22P in the first display region PR1 concealed by the mask layer 10 increases and the area of a portion of the colored portions 22P in the second display region PR2 concealed by the mask layer 10 decreases. As a result, for example, a partially concealed image is displayed in which the portion corresponding to the first display region PR1 appears bright and the portion corresponding to the second display region PR2 appears dark. For example, in the display 1, the portion corresponding to the first display region PR1 appears white and the portion corresponding to the second display region PR2 appears black.

Under the third observation condition, both the portion corresponding to the first display region PR1 and the portion corresponding to the second display region PR2 in the display 1 appear dark. For example, both the portion corresponding to the first display region PR1 and the portion corresponding to the second display region PR2 appear black.

Thus, the display 1 according to the second modified example also displays different images under the first to third observation conditions. That is, the display 1 can display special images. Further, a partially concealed image displayed by the display 1 under the second observation condition can also serve as a latent image.

Moreover, as described above, tilting the display 1 can cause specific changes in color in each of the portion corresponding to the first display region PR1 and the portion corresponding to the second display region PR2 in the partially concealed image displayed by the display 1 under the second observation condition.

Third Modified Example

Figure 26:
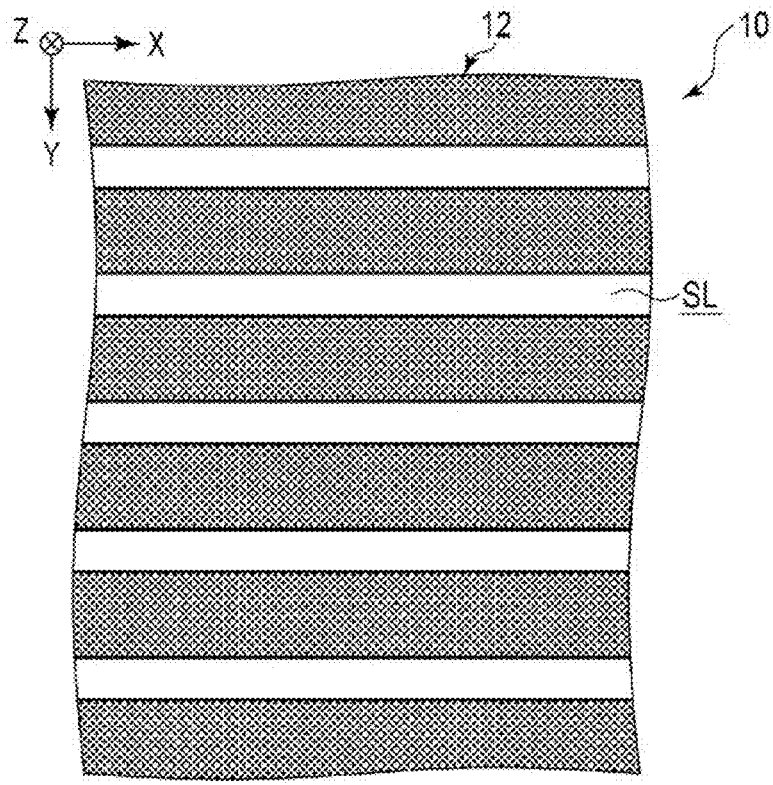
FIG. 26 is a plan view schematically illustrating still another example structure that can be employed for the mask layer.
Figure 27:
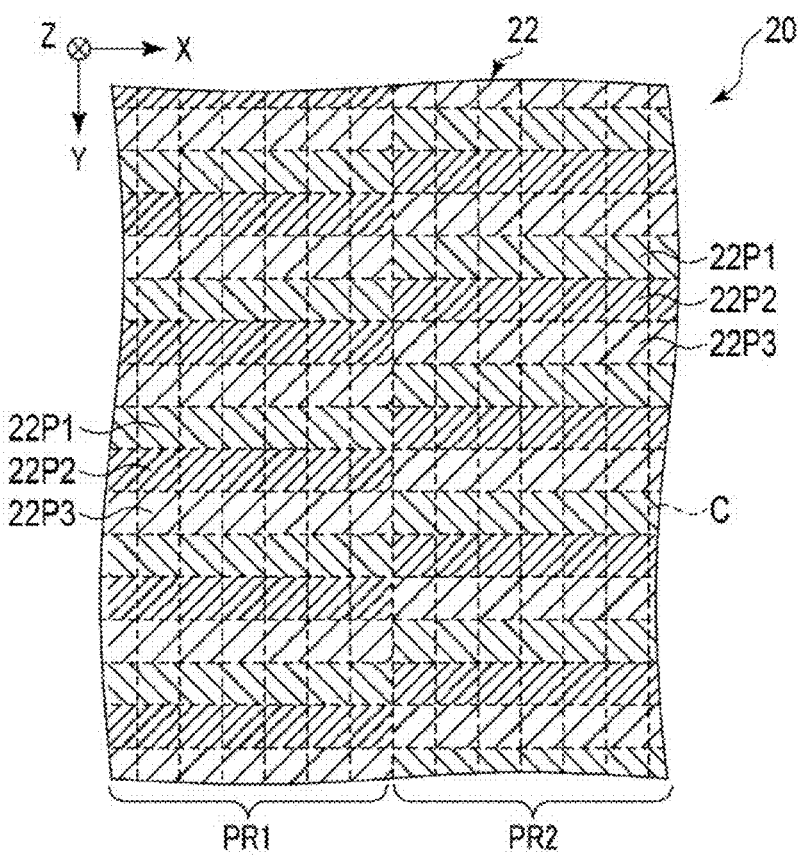
FIG. 27 is a plan view schematically illustrating still another example structure that can be employed for the image carrier.
Figure 28:
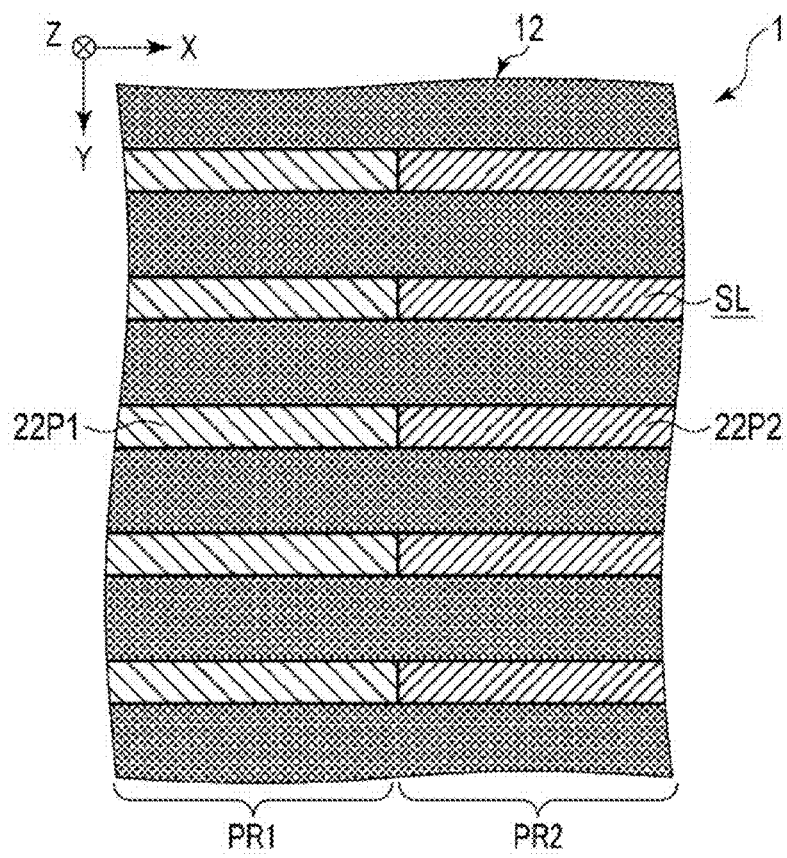
FIG. 28 is a plan view schematically illustrating an example in which a display having the mask layer of FIG. 26 and the image carrier of FIG. 27 displays an image under the second observation condition.

With reference to FIGS. 26 to 28, a third modified example will be described.

FIG. 26 is a plan view schematically illustrating still another example structure that can be employed for the mask layer. FIG. 27 is a plan view schematically illustrating still another example structure that can be employed for the image carrier. FIG. 28 is a plan view schematically illustrating an example in which a display having the mask layer of FIG. 26 and the image carrier of FIG. 27 displays an image under the second observation condition.

The display 1 according to the third modified example is the same as the display 1 according to the first embodiment except that the mask layer 10 and the image carrier 20 employs the structures shown in FIG. 26 and FIG. 27, respectively.

The mask layer 10 of FIG. 26 is substantially the same as the mask layer 10 of the display 1 according to the first embodiment except that the first major surface S1 does not include any of the second scattering region SR2, the first flat region FR1 and the second flat region FR2, and the reflective layer 12 does not include any of the second portion P2, the third portion P3 and the fourth portion P4.

That is, in the mask layer 10 of FIG. 26, the first strip-shaped parts BP1 and the second strip-shaped parts BP2, each extending in the X direction, are alternately arranged in the Y direction over the entire first major surface S1. The width of the second strip-shaped parts BP2 is twice the width of the first strip-shaped parts BP1. In the second strip-shaped parts BP2, a scattering structure that produces isotropic light scattering is provided as a relief structure RS.

The reflective layer 12, which is a metal layer, covers the first major surface S1. The reflective layer 12 has apertures at the positions of the first strip-shaped parts BP1. That is, the reflective layer 12 has the slits SL each extending in the X direction at the positions of the first strip-shaped parts BP1. The pitch of the slits SL is three times the width of the slits SL.

The image carrier 20 of FIG. 27 includes a first display region PR1 and a second display region PR2. Each of the first display region PR1 and the second display region PR2 include a plurality of cells C. These cells C are arranged in the length direction and the width direction of the slits SL. That is, the cells C form a virtual two-dimensional lattice (in this example, a square lattice or a rectangular lattice). The arrangement pitch of the cells C in the width direction of the slits SL is one-third of the arrangement pitch of the slits SL.

The image display layer 22 includes first colored portions 22P1, second colored portions 22P2 and third colored portion 22P3 as the colored portions 22P. The first colored portions 22P1, the second colored portions 22P2 and the third colored portions 22P3 are transparent to visible light and have different transmission spectra in the visible range. As an example, it is assumed that, when illuminated with white light, the first colored portions 22P1 transmit cyan light, the second colored portions 22P2 transmit yellow light, and the third colored portions 22P3 transmit magenta light.

The first colored portions 22P1, the second colored portions 22P2 and the third colored portions 22P3 are disposed in the cells C. That is, the first colored portions 22P1, the second colored portions 22P2 and the third colored portions 22P3 are respectively located on the lattice points of a virtual two-dimensional lattice.

More specifically, in the first display region PR1, the cells C in the (3n−1)th row (n is a natural number) are cells for the first colored portions 22P1, the cells C in the (3n)th row are cells for the second colored portions 22P2, and the cells in the (3n+1)th row are cells for the third colored portion 22P3 among the rows composed of the cells C arranged in the X direction. That is, in the first display region PR1, the respective first colored portions 22P1 are not disposed in the cells C in the (3n)th and (3n+1)th rows, but are disposed in the cells C in the (3n−1)th row among the cells C arranged in the X direction. Further, in the first display region PR1, the respective second colored portions 22P2 are not disposed in the cells C in the (3n−1)th and (3n+1)th rows, but are disposed in the cells C in the (3n)th row among the cells C arranged in the X direction. Further, in the first display region PR1, the respective third colored portions 22P3 are not disposed in the cells C in the (3n−1)th and (3n)th rows, but are disposed in the cells C in the (3n+1)th row among the cells C arranged in the X direction.

On the other hand, in the second display region PR2, the cells C in the (3n−2)th row are cells for the first colored portions 22P1, the cells C in the (3n−1)th row are cells for the second colored portions 22P2, and the cells in the (3n)th row are cells for the third colored portion 22P3 among the rows composed of the cells C arranged in the X direction. That is, in the second display region PR2, the respective first colored portions 22P1 are not disposed in the cells C in the (3n−1)th and (3n)th rows, but are disposed in the cells C in the (3n−2)th row among the cells C arranged in the X direction. Further, in the second display region PR2, the respective second colored portions 22P2 are not disposed in the cells C in the (3n−2)th and (3n)th rows, but are disposed in the cells C in the (3n−1)th row among the cells C arranged in the X direction. Further, in the second display region PR2, the respective third colored portions 22P3 are not disposed in the cells C in the (3n−2)th and (3n−1)th rows, but are disposed in the cells C in the (3n)th row among the cells C arranged in the X direction.

Except for the above points, the image carrier 20 of FIG. 21 is the same as the image carrier 20 of the display 1 according to the first embodiment.

In the first display region PR1, the first colored portions 22P1 may be disposed in all the cells C in the (3n−1)th row, or may be disposed in a part of the cells C in the (3n−1)th row. In the first display region PR1, the second colored portions 22P2 may be disposed in all the cells C in the (3n)th row, or may be disposed in a part of the cells C in the (3n)th row. In the first display region PR1, the third colored portions 22P3 may be disposed in all the cells C in the (3n+1)th row, or may be disposed in a part of the cells C in the (3n+1)th row.

Similarly, in the second display region PR2, the first colored portions 22P1 may be disposed in all the cells C in the (3n−2)th row, or may be disposed in all the cells C in the (3n−2)th row. In the second display region PR2, the second colored portions 22P2 may be disposed in all the cells C in the (3n−1)th row, or may be disposed in a part of the cells C in the (3n−1)th row. In the second display region PR2, the third colored portions 22P3 may be disposed in all the cells C in the (3n)th row, or may be disposed in a part of the cells C in the (3n)th row.

As an example, it is assumed that the first colored portions 22P1, the second colored portions 22P2 and the third colored portions 22P3 are disposed as follows. That is, the first colored portions 22P1 are disposed in all the cells C in the (3n−1)th row in the first display region PR1 and all the cells C in the (3n−2)th row in the second display region PR2. The second colored portions 22P2 are disposed in all the cells C in the (3n)th row in the first display region PR1 and all the cells C in the (3n−1)th row in the second display region PR2. The third colored portions 22P3 are disposed in all the cells C in the (3n+1)th row in the first display region PR1 and all the cells C in the (3n)th row in the second display region PR2.

Under the first observation condition, both the portion corresponding to the first display region PR1 and the portion corresponding to the second display region PR2 in the display 1 according to the third modified example appear bright. For example, both the portion corresponding to the first display region PR1 and the portion corresponding to the second display region PR2 appear white.

As described above, the pitch of the slits SL is three times the width of the slits SL. That is, the width of a portion sandwiched between the adjacent slits SL in the reflective layer 12 is larger than the width of the slit SL. As a result, the area of the relief structure RS increases. The portion of the image displayed under the first observation condition corresponding to the relief structure RS can be made brighter.

Under the second observation condition, for example, as shown in FIG. 25, the mask layer 10 conceals the second colored portions 22P2 and the third colored portions 22P3 in the first display region PR1 and the first colored portions 22P1 and the third colored portions 22P3 in the second display region PR2 without concealing the first colored portions 22P1 in the first display region PR1 and the second colored portions 22P2 in the second display region PR2. As a result, a partially concealed image is displayed in which the portion corresponding to the first display region PR1 and the portion corresponding to the second display region PR2 are different in color. For example, in the display 1, the portion corresponding to the first display region PR1 appears cyan, and the portion corresponding to the second display region PR2 appears yellow.

When the display 1 is tilted under the second observation condition as described above referring to FIG. 14, for example, the area of a portion of the second colored portions 22P2 in the first display region PR1 concealed by the mask layer 10 and the area of a portion of the third colored portions 22P3 in the second display region PR2 concealed by the mask layer 10 increase, and the area of a portion of the first colored portions 22P1 in the first display region PR1 concealed by the mask layer 10 and the area of a portion of the second colored portions 22P2 in the second display region PR2 concealed by the mask layer 10 decrease. As a result, for example, the portion corresponding to the first display region PR1 appears yellow, and the portion corresponding to the second display region PR2 appears magenta.

When the display 1 is further tilted under the second observation condition, for example, the area of a portion of the third colored portions 22P3 in the first display region PR1 concealed by the mask layer 10 and the area of a portion of the first colored portions 22P1 in the second display region PR2 concealed by the mask layer 10 increase, and the area of a portion of the second colored portions 22P2 in the first display region PR1 concealed by the mask layer 10 and the area of a portion of the first colored portions 22P1 in the second display region PR2 concealed by the mask layer 10 decrease. As a result, for example, the portion corresponding to the first display region PR1 appears magenta, and the portion corresponding to the second display region PR2 appears cyan.

Under the third observation condition, both the portion corresponding to the first display region PR1 and the portion corresponding to the second display region PR2 in the display 1 appear to be the same color. For example, due to subtractive color mixing of cyan, yellow and magenta, both the portion corresponding to the first display region PR1 and the portion corresponding to the second display region PR2 appear black.

Thus, the display 1 according to the third modified example also displays different images under the first to third observation conditions. That is, the display 1 can display special images. Further, a partially concealed image displayed by the display 1 under the second observation condition can also serve as a latent image.

Moreover, as described above, tilting the display 1 can cause specific changes in color in each of the portion corresponding to the first display region PR1 and the portion corresponding to the second display region PR2 in the partially concealed image displayed by the display 1 under the second observation condition.

Fourth Modified Example

In the third modified example, the arrangement pitch of the cells C in the width direction of the slits SL is one-third of the arrangement pitch of the slits SL. That is, in the third modified example, the arrangement pitch of the slits SL is three times the arrangement pitch of the cells C in the width direction of the slits SL. A fourth modified example is the same as the third modified example except that the arrangement pitch of the slits SL is changed from the arrangement pitch of the cells C in the width direction of the slits SL.

For example, when the arrangement pitch of the slits SL is changed from 3 m times (m is a natural number) of the arrangement pitch of the cells C in the width direction of the slits SL, the relative positions of the first colored portions 22P1, the second colored portions 22P2 and the third colored portions 22P3 to the slits SL in the first display region PR1 and the second display region PR2 change in the arrangement direction of the slits SL. Therefore, with this structure, a partially concealed image displayed under the second observation condition has a change in color in the arrangement direction of the slits SL in a portion corresponding to the first display region PR1 and a portion corresponding to the second display region PR2. That is, with the above structure, rainbow fringes appear in the portion corresponding to the first display region PR1 and the portion corresponding to the second display region PR2 in a partially concealed image displayed under the second observation condition.

Preferably, the arrangement pitch PP1 of the slits SL and the arrangement pitch PP2 of the cells C in the width direction of the slits SL satisfy the relationship represented by the following inequality (1) or (2).

$$0\% < (PP1-3 \times PP2)/(3 \times PP2) < 25\% \quad (1)$$

$$0\% < (3 \times PP2-PP1)/(3 \times PP2) < 25\% \quad (2)$$

When the pitch PP1 is further changed from three times the pitch PP2, the pitch of fringes in the rainbow fringes decreases. Therefore, when observing a partially concealed image displayed under the second observation condition, it is difficult to distinguish the portion corresponding to the first display region PR1 and the portion corresponding to the second display region PR2 from each other.

Fifth Modified Example

With reference to FIGS. 29 to 34, a fifth modified example will be described.

Figure 29:
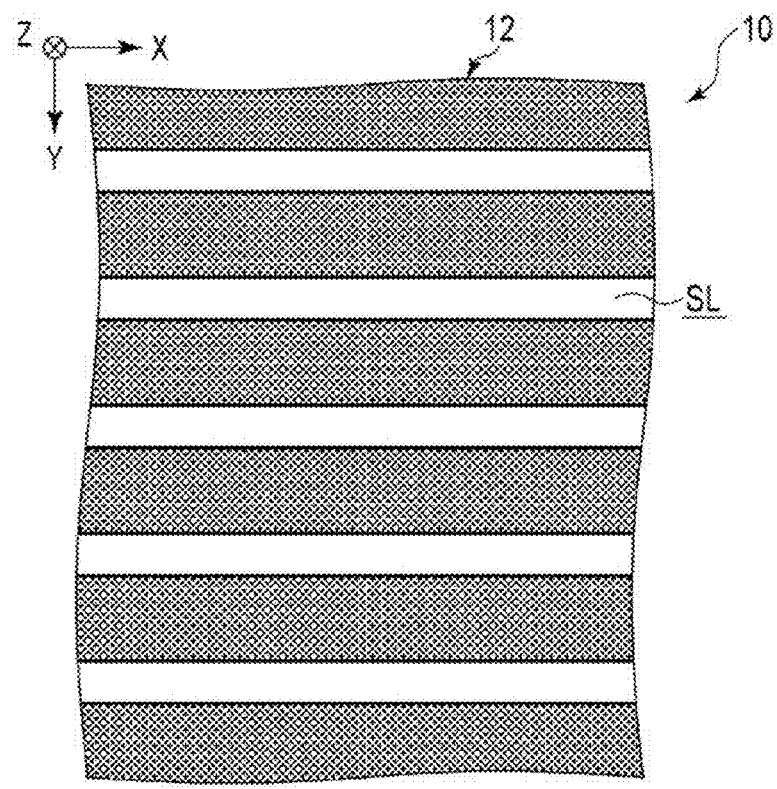
FIG. 29 is a plan view schematically illustrating still another example structure that can be employed for the mask layer.
Figure 30:
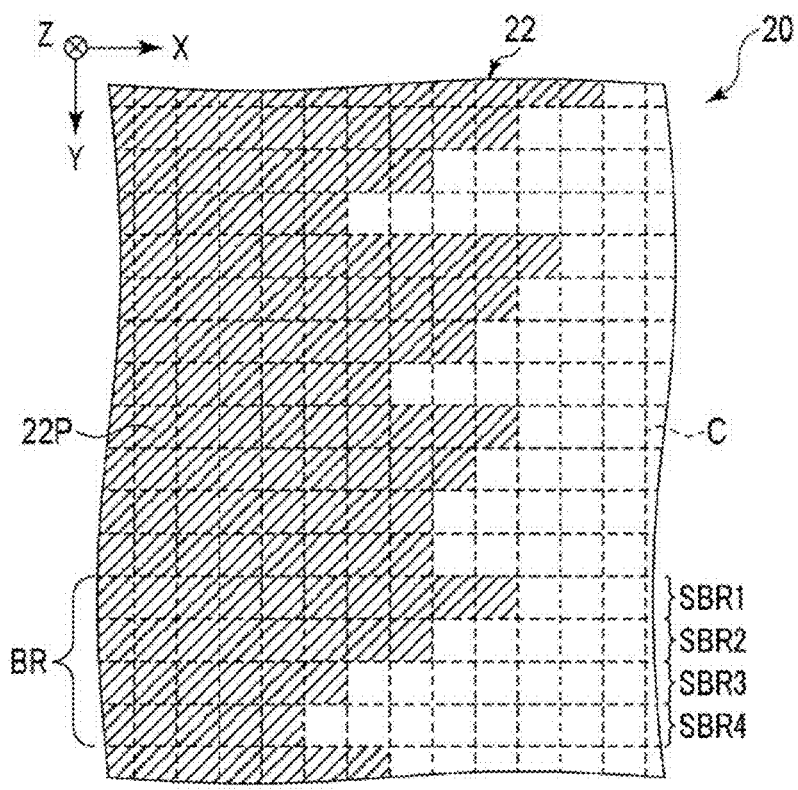
FIG. 30 is a plan view schematically illustrating still another example structure that can be employed for the image carrier.
Figure 31:
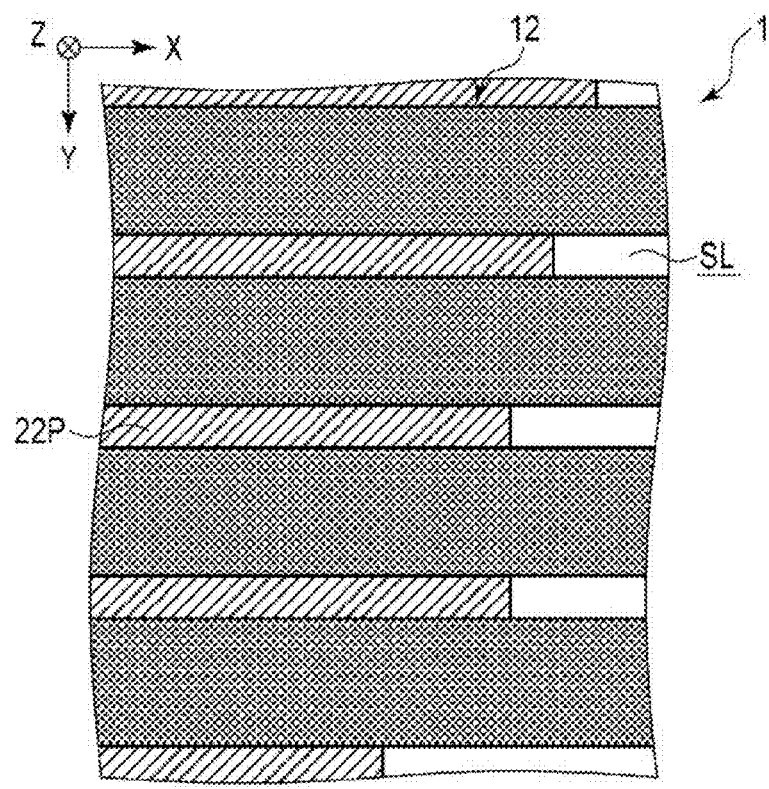
FIG. 31 is a plan view schematically illustrating an example in which a display having the mask layer of FIG. 29 and the image carrier of FIG. 30 displays an image under the second observation condition.
Figure 32:
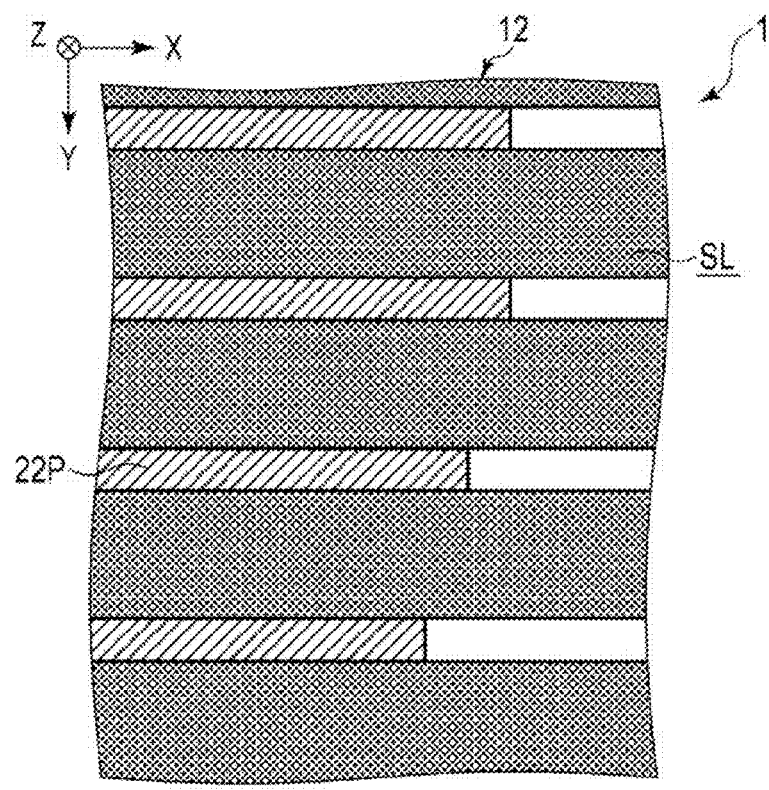
FIG. 32 is a plan view schematically illustrating another example in which a display having the mask layer of FIG. 29 and the image carrier of FIG. 30 displays an image under the second observation condition.
Figure 33:
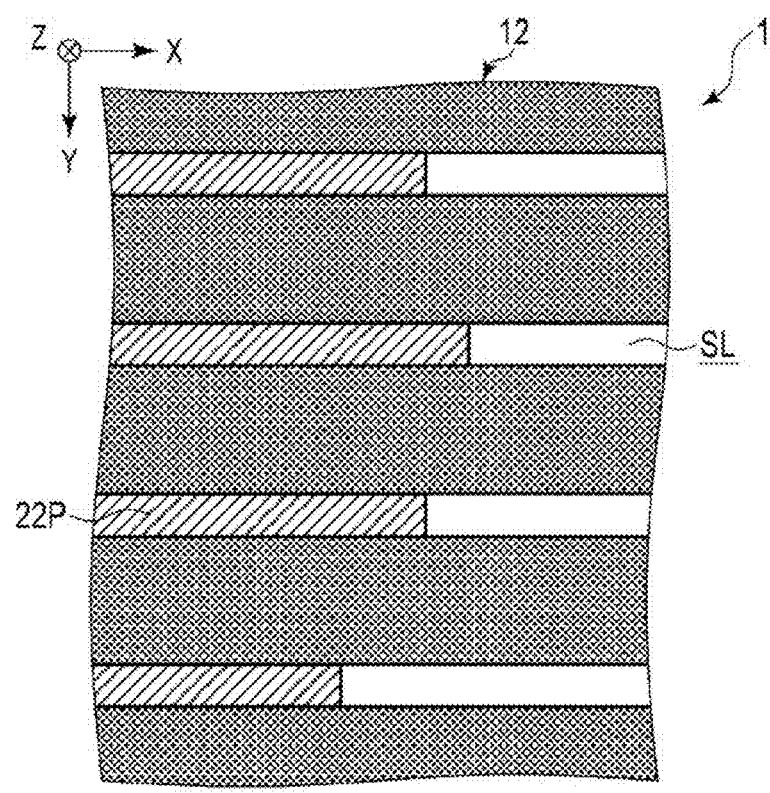
FIG. 33 is a plan view schematically illustrating still another example in which a display having the mask layer of FIG. 29 and the image carrier of FIG. 30 displays an image under the second observation condition.

FIG. 29 is a plan view schematically illustrating still another example structure that can be employed for the mask layer. FIG. 30 is a plan view schematically illustrating still another example structure that can be employed for the image carrier. FIG. 31 is a plan view schematically illustrating an example in which a display having the mask layer of FIG. 29 and the image carrier of FIG. 30 displays an image under the second observation condition. FIG. 32 is a plan view schematically illustrating another example in which a display having the mask layer of FIG. 29 and the image carrier of FIG. 30 displays an image under the second observation condition. FIG. 33 is a plan view schematically illustrating still another example in which a display having the mask layer of FIG. 29 and the image carrier of FIG. 30 displays an image under the second observation condition.

Figure 34:
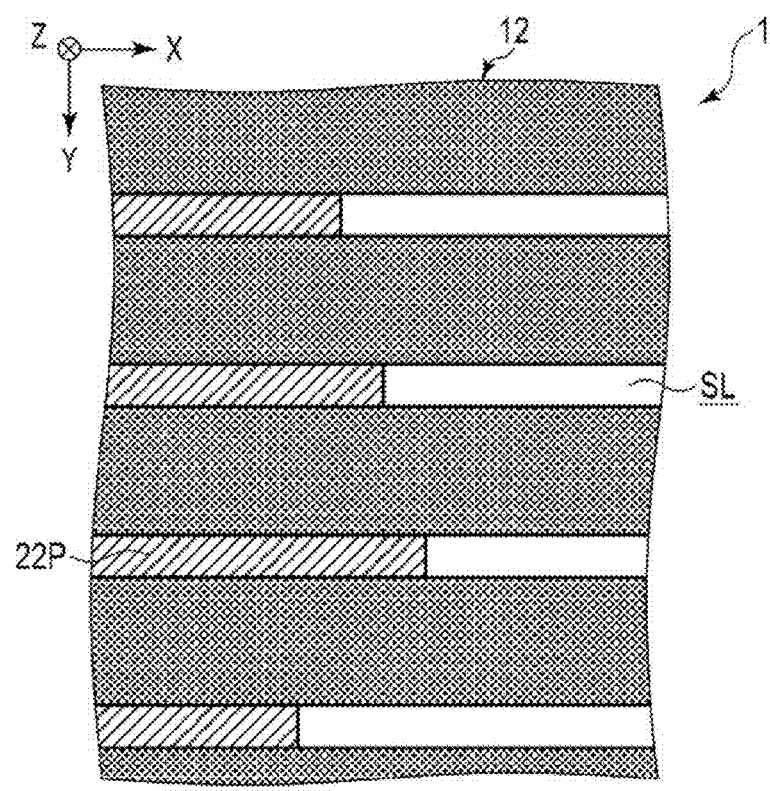
FIG. 34 is a plan view schematically illustrating still another example in which a display having the mask layer of FIG. 29 and the image carrier of FIG. 30 displays an image under the second observation condition.

FIG. 34 is a plan view schematically illustrating still another example in which a display having the mask layer of FIG. 29 and the image carrier of FIG. 30 displays an image under the second observation condition.

The display 1 according to the fifth modified example is the same as the display 1 according to the first embodiment except that the mask layer 10 and the image carrier 20 employs the structures shown in FIG. 29 and FIG. 30, respectively.

The mask layer 10 of FIG. 29 is substantially the same as the mask layer 10 of the display 1 according to the first embodiment except that the first major surface S1 does not include any of the second scattering region SR2, the first flat region FR1 and the second flat region FR2, and the reflective layer 12 does not include any of the second portion P2, the third portion P3 and the fourth portion P4.

That is, in the mask layer 10 of FIG. 29, the first strip-shaped parts BP1 and the second strip-shaped parts BP2, each extending in the X direction, are alternately arranged in the Y direction over the entire first major surface S1. The width of the second strip-shaped parts BP2 is three times the width of the first strip-shaped parts BP1. In the second strip-shaped parts BP2, a scattering structure that produces isotropic light scattering is provided as a relief structure RS.

The reflective layer 12, which is a metal layer, covers the first major surface S1. The reflective layer 12 has apertures at the positions of the first strip-shaped parts BP1. That is, the reflective layer 12 has the slits SL each extending in the X direction at the positions of the first strip-shaped parts BP1. The pitch of the slits SL is four times the width of the slits SL.

The image carrier 20 of FIG. 30 includes a first display region PR1 and a second display region PR2. Each of the first display region PR1 and the second display region PR2 include a plurality of cells C. These cells C are arranged in the length direction and the width direction of the slits SL. That is, the cells C form a virtual two-dimensional lattice (in this example, a square lattice or a rectangular lattice). The arrangement pitch of the cells C in the width direction of the slits SL is one-fourth of the arrangement pitch of the slits SL.

The cells C constitute a plurality of band-shaped regions BR, each formed of a first sub-region SBR1, a second sub-region SBR2, a third sub-region SBR3 or a fourth sub-region SBR4. The band-shaped regions BR, each extending in the length direction of the slits SL, are arranged in the width direction of the slits SL.

In the band-shaped regions BR, each of the first sub-region SBR1, the second sub-region SBR2, the third sub-region SBR3 and the fourth sub-region SBR4 have a shape extending in the length direction of the slits SL. In the band-shaped regions BR, the first sub-region SBR1, the second sub-region SBR2, the third sub-region SBR3 and the fourth sub-region SBR4 are arranged in this order in the width direction of the slits SL. Each of the first sub-region SBR1, the second sub-region SBR2, the third sub-region SBR3 and the fourth sub-region SBR4 are formed of the cells C arranged in a line in the length direction of the slits SL.

The colored portions 22P are disposed in the cells C. That is, the colored portions 22P are respectively located on the lattice points of a virtual two-dimensional lattice. As an example, it is assumed the colored portions 22P are black.

In the band-shaped regions BR, the colored portions 22P are disposed in a part of the plurality of cells C constituting the first sub-region SBR1, and are not disposed in the remaining cells C. One or more band-shaped regions BR may include the first sub-region SBR1 in which the colored portions 22P are not disposed in any of the plurality of cells C, or may include the first sub-region SBR1 in which the colored portions 22P are disposed in all the plurality of cells C.

In the band-shaped regions BR, the arrangement of the colored portions 22P in the second sub-region SBR2 is slightly different from the arrangement of the colored portions 22P in the first sub-region SBR1 included in the band-shaped region BR. In one or more band-shaped regions BR, the arrangement of the colored portions 22P in the second sub-region SBR2 may be the same as the arrangement of the colored portions 22P in the first sub-region SBR1 included in the band-shaped region BR.

In the band-shaped regions BR, the arrangement of the colored portions 22P in the third sub-region SBR3 is slightly different from the arrangement of the colored portions 22P in the second sub-region SBR2 included in the band-shaped region BR. In one or more band-shaped regions BR, the arrangement of the colored portions 22P in the third sub-region SBR3 may be the same as the arrangement of the colored portions 22P in the second sub-region SBR2 included in the band-shaped region BR.

In the band-shaped regions BR, the arrangement of the colored portions 22P in the fourth sub-region SBR4 is slightly different from the arrangement of the colored portions 22P in the third sub-region SBR3 included in the band-shaped region BR. In one or more band-shaped regions BR, the arrangement of the colored portions 22P in the fourth sub-region SBR4 may be the same as the arrangement of the colored portions 22P in the third sub-region SBR3 included in the band-shaped region BR.

Except for the above points, the image carrier 20 of FIG. 21 is the same as the image carrier 20 of the display 1 according to the first embodiment.

Under the first observation condition, the entire display 1 according to the fifth modified example appears bright. For example, the entire display 1 appears white.

Under the second observation condition, for example, as shown in FIG. 31, the mask layer 10 conceals the second sub-region SBR2, the third sub-region SBR3 and the fourth sub-region SBR4 in the band-shaped regions BR without concealing the first sub-region SBR1 in the band-shaped regions BR. As a result, a first partially concealed image which includes a black pattern corresponding to the arrangement of the colored portions 22P disposed in the first sub-region SBR1 is displayed.

When the display 1 is tilted under the second observation condition as described above referring to FIG. 14, the area of a portion of the first sub-region SBR1 in the band-shaped regions BR concealed by the mask layer 10 increases, and the area of a portion of the second sub-region SBR2 in the band-shaped region BR concealed by the mask layer 10 decreases. For example, as shown in FIG. 32, the mask layer 10 conceals the first sub-region SBR1, the third sub-region SBR3 and the fourth sub-region SBR4 in the band-shaped regions BR without concealing the second sub-region SBR2 in the band-shaped regions BR. As a result, a second partially concealed image which includes a black pattern corresponding to the arrangement of the colored portions 22P disposed in the second sub-region SBR2 is displayed.

When the display 1 is further tilted under the second observation condition, the area of a portion of the second sub-region SBR2 in the band-shaped regions BR concealed by the mask layer 10 increases, and the area of a portion of the third sub-region SBR3 in the band-shaped region BR concealed by the mask layer 10 decreases. For example, as shown in FIG. 33, the mask layer 10 conceals the first sub-region SBR1, the second sub-region SBR2 and the fourth sub-region SBR4 in the band-shaped regions BR without concealing the third sub-region SBR3 in the band-shaped regions BR. As a result, a third partially concealed image which includes a black pattern corresponding to the arrangement of the colored portions 22P disposed in the third sub-region SBR3 is displayed.

When the display 1 is further tilted under the second observation condition, the area of a portion of the third sub-region SBR3 in the band-shaped regions BR concealed by the mask layer 10 increases, and the area of a portion of the fourth sub-region SBR4 in the band-shaped region BR concealed by the mask layer 10 decreases. For example, as shown in FIG. 34, the mask layer 10 conceals the first sub-region SBR1, the second sub-region SBR2 and the third sub-region SBR3 in the band-shaped regions BR without concealing the fourth sub-region SBR4 in the band-shaped regions BR. As a result, a fourth partially concealed image which includes a black pattern corresponding to the arrangement of the colored portions 22P disposed in the fourth sub-region SBR4 is displayed.

As described above, the arrangement of the colored portions 22P in the second sub-region SBR2 may be slightly different from or the same as the arrangement of the colored portions 22P in the first sub-region SBR1 included in the band-shaped region BR. Further, the arrangement of the colored portions 22P in the third sub-region SBR3 may be slightly different from or the same as the arrangement of the colored portions 22P in the second sub-region SBR2 included in the band-shaped region BR. Further, the arrangement of the colored portions 22P in the fourth sub-region SBR4 may be slightly different from or the same as the arrangement of the colored portions 22P in the third sub-region SBR3 included in the band-shaped region BR. As a result, to the observer observing the first to fourth partially concealed images sequentially displayed when the tilt angle of the display 1 is changed under the second observation condition, the position and/or shape of the black pattern in the partially concealed images appear to continuously change.

Under the third observation condition, a portion of the display 1 corresponding to the image display layer 22 appear to dark, and the other portions appear bright. For example, a portion corresponding to the image display layer 22 appear black, and the other portions appear white.

Thus, the display 1 according to the fifth modified example also displays different images under the first to third observation conditions. That is, the display 1 can display special images. Further, a partially concealed image displayed by the display 1 under the second observation condition can also serve as a latent image.

As described above, tilting the display 1 causes a change in the position and/or shape of the pattern in the partially concealed image displayed by the display 1 under the second observation condition. That is, the display 1 can display a moving image under the second observation condition, for example.

OTHER MODIFICATIONS

Two or more of the techniques described in the above embodiments and modified embodiments can be combined with each other.

For example, in the third to fifth modified examples, the width of a portion sandwiched between the adjacent slits SL in the reflective layer 12 is larger than the width of the slit SL. That is, in the third to fifth modified examples, the width of the second strip-shaped parts BP2 is larger than the width of the first strip-shaped parts BP1. This structure can also be applied to the first and second embodiments and the first and second modified examples.

As described above, increasing the width of a portion sandwiched between the adjacent slits SL in the reflective layer 12 to be larger than the width of the slit SL can increase the area of the relief structure. As a result, the portion of the image displayed under the first observation condition corresponding to the relief structure can be made brighter.

A ratio of the width of a portion sandwiched between the adjacent slits SL in the reflective layer 12 to the width of the slit SL, that is, a ratio of the width of the second strip-shaped part BP2 to the width of the first strip-shaped part BP1 is preferably 6 or less. Increasing this ratio reduces the visibility of the partially concealed image under the second observation condition.

Further, various modifications can be made to the structures described in the above embodiments and modified examples.

For example, in the display 1 according to the first embodiment, slits having a length direction which is different from that of the first slits SL1 and the second slits SL2 and a width and a pitch which are the same as those of the first slits SL1 and the second slits SL2 may be provided in the second portion P2 and the fourth portion P4 in the reflective layer 12. By providing such slits in the second portion P2 and the fourth portion P4 and providing the relief structure RS in the entire portion of the second portion P2 sandwiched between the slits, the second portion P2 and the fourth portion P4 have substantially the same reflection properties as those of the first portion P1 and the third portion P3, respectively. Therefore, even when the display 1 is tilted under the first observation condition so that specularly reflected light can be seen, the portion corresponding to the second portion P2 and the portion corresponding to the fourth portion P4 appear to have substantially the same brightness as that of the portion corresponding to the first portion P1 and the portion corresponding to the third portion P3, respectively. Since the slits provided in the second portion P2 and the fourth portion P4 have a length direction different from that of the first slits SL1 and the second slit SL2, the portions corresponding to the second portion P2 and the fourth portion P4 can be distinguished from the portions corresponding to the first portion P1 and the third portion P3 in a partially concealed image displayed under the second observation condition.

Similarly, in the display 1 according to the second embodiment, slits having a length direction which is different from that of the first slits SL1 and the second slits SL2 and a width and a pitch which are the same as those of the first slits SL1 and the second slits SL2 may be provided in the second portion P2, the fourth portion P4 and the sixth portion P6 in the reflective layer 12. By providing such slits in the second portion P2, the fourth portion P4 and the sixth portion P6, providing the first anisotropic scattering structure RS1 in the entire portion of the second portion P2 sandwiched between the slits, and providing the second anisotropic scattering structure RS2 in the entire portion of the sixth portion P6 sandwiched between the slits, the second portion P2, the fourth portion P4 and the sixth portion P6 have substantially the same reflection properties as those of the first portion P1, the third portion P3 and the fifth portion P5, respectively. Therefore, even when the display 1 is tilted under the first observation condition so that specularly reflected light can be seen, the portion corresponding to the second portion P2, the portion corresponding to the fourth portion P4 and the portion corresponding to the sixth portion P6 appear to have substantially the same brightness as that of the portion corresponding to the first portion P1, the portion corresponding to the third portion P3 and the portion corresponding to the fifth portion P5, respectively. Since the slits provided in the second portion P2, the fourth portion P4 and the sixth portion P6 have a length direction different from that of the first slits SL1 and the second slit SL2, the portions corresponding to the second portion P2, the fourth portion P4 and the sixth portion P6 can be distinguished from the portions corresponding to the first portion P1, the third portion P3 and the fifth portion P5 in a partially concealed image displayed under the second observation condition.

As the relief structure, a light deflection structure that emits strong reflected light at an angle different from a specular reflection angle, such as a blazed diffraction grating, may be provided instead of providing a scattering structure that produces isotropic light-scattering or an anisotropic scattering structure that exhibits light-scattering anisotropy.

In the above modified examples, the colored portions 22P disposed in the cells C have a rectangular or square shape. The shape of the colored portions 22P may be other shapes such as a circular shape.

In the display 1 according to the above embodiments and modified examples, the image display layer 22 is a print layer containing at least one of a dye and a pigment. The image display layer 22 may display a transmitted light image using a transmissive hologram and/or a diffraction grating.

In the display 1 according to the above embodiments and modified examples, the image display layer 22 is designed to display a two-dimensional image as a partially concealed image under the second observation condition. The image display layer 22 may be designed to display a three-dimensional image as a partially concealed image under the second observation condition. Such a three-dimensional image can be displayed using a transmissive hologram and/or a diffraction grating.

The display 1 according to the above embodiments and modified examples has a structure in which the mask layer 10 and the image carrier 20 are bonded to each other with the adhesive layer 30 interposed therebetween. The adhesive layer 30 and the transparent material layer 11 may be omitted from the display 1. In this case, the relief structure RS or the first anisotropic scattering structure RS1 and the second anisotropic scattering structure RS2 may be provided on a surface of the transparent substrate 21, specifically, on a side of the transparent substrate 21 opposite to that on which the image display layer 22 is provided, and the reflective layer 12 may be provided thereon.

As the reflective layer 12, an inorganic dielectric layer such as a transparent oxide layer may be provided instead of providing a metal layer. Alternatively, the reflective layer 12 may be omitted. When the combination of the transparent material layer 11 and a layer covering the surface on which the relief structure is provided has reflection properties in which the brightness exceeds 1 in all the reflection angle range of 100 or more and less than 90°, the relief structure can exhibit sufficiently high optical effect. That is, under the first observation condition, an image derived from the relief structure is displayed with high visibility, and under the second observation condition, a portion of the transmitted light image corresponding to the second strip-shaped parts is sufficiently concealed by the mask layer.

The above display 1 can be used in, for example, identification (ID) cards such as employee ID cards, driver's licenses and student ID cards. The above display 1 can also be used in securities such as bank notes, stock certificates, gift certificates, train tickets and admission tickets.

EXAMPLES

A transfer foil including a mask layer 10 having a structure similar to that described above referring to FIGS. 15 to 17 was prepared by the method described below.

First, an acrylic release material was applied to a 16 μm thick substrate made of polyethylene terephthalate by a gravure coating method to form a release layer. The dry thickness of the release layer was 1 μm.

Then, a two-part curing type urethane resin was applied to the release layer by a gravure coating method, and the coating film was dried. The dry thickness of the coating film was 1 μm. An embossing plate heated to 2000° C. was pressed against the dried film to form a first anisotropic scattering structure RS1 and a second anisotropic scattering structure RS2. Thus, a transparent material layer 11 having a first anisotropic scattering structure RS1 and a second anisotropic scattering structure RS2 on the surface was obtained.

Then, aluminum was deposited by vapor deposition at 50 nm thickness on the transparent material layer 11 to form a metal layer. The metal layer was processed into a stripe pattern using a laser marker (manufactured by Keyence Corp.) to obtain a reflective layer 12.

Not only the first portion P1, the third portion P3 and the fifth portion P5, but also the second portion P2, the fourth portion P4 and the sixth portion were processed into a stripe pattern. In the first portion P1, the third portion P3 and the fourth portion P4, the length direction of the lines constituting the stripe pattern was parallel to the X direction. On the other hand, in the second portion P2, the fourth portion P4 and the sixth portion P6, the length direction of the lines constituting the stripe pattern was parallel to the Y direction. All the stripe patterns had a line width of 125 μm and a line pitch of 250 μm.

Thus, a transfer foil was obtained in which the mask layer 10 was provided on the substrate.

While the transfer foil was obtained as described above, a 1 mm thick card made of a cured product of polycarbonate resin was prepared as a transparent substrate 21. Then, the mask layer 10 was transferred from the substrate of the transfer foil to one major surface of the transparent substrate 21 by roll transfer using a rubber roll with a surface temperature of 200° C. On the major surface of the transparent substrate 21, an adhesive layer 30 was provided in advance.

Next, an image display layer 22 described above referring to FIG. 27 was formed using a card printer.

Specifically, an intermediate transfer medium was first prepared. The intermediate transfer medium was composed of a base film, and a protective layer 23 and an image-receiving layer/adhesive layer provided in sequence on the base film. Then, first colored portions 22P1, second colored portions 22P2 and third colored portions 22P3 were provided on the image-receiving layer/adhesive layer by transfer using a thermal head. The diameter of each of the first colored portions 22P1, the second colored portions 22P2 and the third colored portions 22P3 was 40 μm. The pitch of cells C in the Y direction was 125/3 μm.

The intermediate transfer medium in which an image was thus recorded was placed on a laminate including the mask layer 10 and the transparent substrate 21 with the image-receiving layer/adhesive layer being in contact with the transparent substrate 21. Then, the laminate including the protective layer 23, the image-receiving layer/adhesive layer, the first colored portions 22P1, the second colored portions 22P2 and the third colored portions 22P3 was thermally transferred onto the transparent substrate 21.

Thus, a display 1 was obtained.

The display 1 was observed under the first observation condition shown in FIG. 10. As a result, portions of the display 1 corresponding to the first scattering region SR1 and the second scattering region SR2 emitted strong scattered light and appeared bright. On the other hand, portions of the display 1 corresponding to the third scattering region SR3 and the fourth scattering region SR4 emitted little scattered light and appeared dark. Further, portions of the display 1 corresponding to the first flat region FR1 and the second flat region FR2 did not emit scattered light and appeared to have the same brightness as the portions corresponding to the third scattering region SR3 and the fourth scattering region SR4.

Next, the display 1 was observed under the same condition except that the display 1 had been rotated 90° about an axis parallel to the Z direction as shown in FIG. 18. As a result, portions of the display 1 corresponding to the first scattering region SR1 and the second scattering region SR2 emitted little scattered light and appeared dark. On the other hand, portions of the display 1 corresponding to the third scattering region SR3 and the fourth scattering region SR4 emitted strong scattered light and appeared bright. Further, portions of the display 1 corresponding to the first flat region FR1 and the second flat region FR2 did not emit scattered light and appeared to have the same brightness as the portions corresponding to the first scattering region SR1 and the second scattering region SR2.

Also, the display 1 was observed under the second observation condition shown in FIG. 14.

As a result, a portion where the first display region PR1 and the first portion P1 overlapped each other, a portion where the first display region PR1 and the third portion P3 overlapped each other, and a portion where the first display region PR1 and the fifth portion P5 overlapped each other appeared to be the same color.

Further, a portion where the second display region PR2 and the first portion P1 overlapped each other, a portion where the second display region PR2 and the third portion P3 overlapped each other, and a portion where the second display region PR2 and the fifth portion P5 overlapped each other appeared to be the same color. The color of these portions was different from the color of the portion where the first display region PR1 and the first portion P1 overlapped each other, the portion where the first display region PR1 and the third portion P3 overlapped each other, and the portion where the first display region PR1 and the fifth portion P5 overlapped each other.

Further, a portion where the first display region PR1 and the second portion P2 overlapped each other, a portion where the first display region PR1 and the fourth portion P4 overlapped each other, a portion where the first display region PR1 and the sixth portion P6 overlapped each other, a portion where the second display region PR2 and the second portion P2 overlapped each other, a portion where the second display region PR2 and the fourth portion P4 overlapped each other, and a portion where the second display region PR2 and the sixth portion P6 overlapped each other appeared to be the same color. The color of these portions was different from the color of the portion where the first display region PR1 and the first portion P1 overlapped each other, the portion where the first display region PR1 and the third portion P3 overlapped each other, and the portion where the first display region PR1 and the fifth portion P5 overlapped each other, and the color of the portion where the second display region PR2 and the first portion P1 overlapped each other, the portion where the second display region PR2 and the third portion P3 overlapped each other, and the portion where the second display region PR2 and the fifth portion P5 overlapped each other.

Finally, the display 1 was observed under the third observation condition. As a result, all the portions appeared to be the same color.

[Reference Signs List]1 . . . Display; 10 . . . Mask layer; 11 . . . Transparent material layer; 12 . . . Reflective layer; 20 . . . Image carrier; 21 . . . Transparent substrate; 22 . . . Image display layer; 22A . . . First image display layer; 22B . . . Second image display layer; 22C . . . Third image display layer; 22P . . . Colored portion; 22P1 . . . First colored portion; 22P2 . . . Second colored portion; 22P3 . . . Third colored portion; 23 . . . Protective layer; 30 . . . Adhesive layer; BP1 . . . First strip-shaped part; BP2 . . . Second strip-shaped part; BR . . . Band-shaped region; C . . . Cell; FR1 . . . First flat region; FR2 . . . Second flat region; G1 . . . First groove; G2 . . . Second groove; IL . . . Illumination light; LS . . . Light source; OB . . . Observer; P1 . . . First portion; P2 . . . Second portion; P3 . . . Third portion; P4 . . . Fourth portion; P5 . . . Fifth portion; P6 . . . Sixth portion; PR1 . . . First display region; PR2 . . . Second display region; RL . . . Reflected light; RS . . . Relief structure; RS1 . . . First anisotropic scattering structure; RS2 . . . Second anisotropic scattering structure; S1 . . . First major surface' S2 . . . Second major surface; SBR1 . . . First sub-region; SBR2 . . . Second sub-region; SBR3 . . . Third sub-region; SBR4 . . . Fourth sub-region; SL . . . Slit; SL1 . . . First slit; SL2 . . . Second slit; SR1 . . . First scattering region; SR2 . . . Second scattering region; SR3 . . . Third scattering region; SR4 . . . Fourth scattering region; TL . . . Transmitted light.

What is claimed is:

1. A display, comprising:
an image display layer including one or more colored portions, the image display layer displaying a transmitted light image corresponding to the one or more colored portions when illuminated with white light; and
a mask layer including a transparent material layer having a first major surface and a second major surface, the first major surface including one or more regions each composed of first and second strip-shaped parts alternately arranged in a width direction, the second strip-shaped parts being provided with a relief structure, and a portion of the mask layer, corresponding to at least one of the one or more regions, concealing a portion of the transmitted light image corresponding to the second strip-shaped parts.

2. The display of claim 1, wherein
the first major surface is separated from the image display layer.

3. The display of claim 2, wherein
a distance from the first major surface to the image display layer is in a range of 50 μm to 2 mm.

4. The display of claim 1, wherein
the first strip-shaped parts have a pitch $P_B1$ in a range of 50 μm to 500 μm.

5. The display of claim 1, wherein
a ratio $W_B1/W_B2$ between a width $W_B1$ of the first strip-shaped parts and a width $W_B2$ of the second strip-shaped parts is in a range of 1/4 to 2.

6. The display of claim 1, wherein
a partially concealed image is produced by partially concealing the transmitted light image by the mask layer, and at least one of a color and a shape of the partially concealed image changes when tilting the display about an axis parallel to a length direction of the first and second strip-shaped parts.

7. The display of claim 1, wherein
the transmitted light image produces moiré when partially concealed by the mask layer.

8. The display of claim 1, further comprising a reflective layer that covers the first major surface.

9. The display of claim 8, wherein
the reflective layer includes a metal layer, and a portion of the metal layer corresponding to at least one of the one or more regions has a plurality of slits that extend in a length direction of the first strip-shaped parts at positions of the first strip-shaped parts.

10. The display of claim 1, wherein
the relief structure is a scattering structure in at least one of the one or more regions.

11. The display of claim 1, wherein
the relief structure is an anisotropic scattering structure composed of a plurality of grooves arranged in a width direction in at least one of the one or more regions.

12. The display of claim 1, wherein
the one or more regions includes two or more regions in which the relief structure is the anisotropic scattering structure, the plurality of grooves have length directions different from each other, and the first and second strip-shaped parts have arrangement directions different from each other.

13. The display of claim 1, further comprising a reflective layer that covers the first major surface, wherein
the one or more regions includes first and second scattering regions in which each of the second strip-shaped parts is provided with a scattering structure as the relief structure,
the first major surface further includes first and second flat regions each having a flat surface,
the reflective layer includes a metal layer,
a first portion of the metal layer corresponding to the first scattering region has a plurality of first slits that extend in a length direction of the first strip-shaped parts at positions of the first strip-shaped parts,
a second portion of the metal layer corresponding to the second scattering region has no apertures or has a plurality of slits arranged in a width direction and having a length direction different from that of the plurality of first slits,
a third portion of the metal layer corresponding to the first flat region has a plurality of second slits arranged in a width direction, the second slits having the same length direction as that of the plurality of first slits, and
a fourth portion of the metal layer corresponding to the second flat region has no apertures or has a plurality of slits arranged in a width direction and having a length direction different from that of the plurality of first slits.

14. The display of claim 1, further comprising a reflective layer that covers the first major surface, wherein
the one or more regions include first to fourth scattering regions in which each of the second strip-shaped parts is provided with an anisotropic scattering structure as the relief structure, the anisotropic scattering structure being composed of a plurality of grooves arranged in a width direction, the first major surface further includes first and second flat regions each having a flat surface, the reflective layer includes a metal layer, a first portion of the metal layer corresponding to the first scattering region has a plurality of first slits that extend in a length direction of the first strip-shaped parts at positions of the first strip-shaped parts, a second portion of the metal layer corresponding to the second scattering region has no apertures or has a plurality of slits arranged in a width direction and having a length direction different from that of the plurality of first slits, a third portion of the metal layer corresponding to the first flat region has a plurality of second slits arranged in a width direction, the second slits having a same length direction as that of the plurality of first slits, a fourth portion of the metal layer corresponding to the second flat region has no apertures or has a plurality of slits arranged in a width direction and having a length direction different from that of the plurality of first slits, a fifth portion of the metal layer corresponding to the third scattering region has a plurality of third slits that extend in a length direction of the first strip-shaped parts at positions of the first strip-shaped parts, a sixth portion of the metal layer corresponding to the fourth scattering region has no apertures or has a plurality of slits arranged in a width direction and having a length direction different from that of the plurality of first slits, the first and second scattering regions have the same width direction of the plurality of grooves, and the third and fourth scattering regions have the same width direction of the plurality of grooves, the width direction of the plurality of grooves being different from that of the first and second scattering regions.

* * * * *